(12) United States Patent
Kobayashi

(10) Patent No.: US 6,333,793 B1
(45) Date of Patent: Dec. 25, 2001

(54) IMAGE QUALITY IN ERROR DIFFUSION SCHEME

(75) Inventor: Koji Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/205,723

(22) Filed: Dec. 4, 1998

(30) Foreign Application Priority Data

Dec. 8, 1997 (JP) .................................................. 9-356206

(51) Int. Cl.$^7$ .................................................. G06K 9/36
(52) U.S. Cl. .................................................. 358/1.9; 382/237
(58) Field of Search ........................... 382/237, 251–253; 358/534–536, 429, 455–460, 1.9, 298

(56) References Cited

U.S. PATENT DOCUMENTS

| | | | |
|---|---|---|---|
| 5,515,180 | * 5/1996 | Maeda et al. | 358/458 |
| 5,608,821 | * 3/1997 | Metcalfe et al. | 382/252 |
| 5,880,857 | * 3/1999 | Shiau et al. | 358/456 |
| 6,122,070 | * 9/2000 | Kang et al. | 358/1.9 |
| 6,185,336 | * 2/2001 | Clark et al. | 382/224 |

FOREIGN PATENT DOCUMENTS 7-226841   8/1995 (JP) .

* cited by examiner

Primary Examiner—Thomas D. Lee
Assistant Examiner—Stephen Brinich
(74) Attorney, Agent, or Firm—Oblon, Spivak, McClelland, Maier & Neustadt, P.C.

(57) ABSTRACT

An image processing device converts multi-level-image data into binary-image data by using one of a least average error method and an error diffusion method. The image processing device includes an image-data-correction unit which corrects multi-level-image data of a current pixel by adding thereto an error diffused from surrounding binarized pixels so as to output corrected-image data. The image processing device further includes a binarizing unit which binarizes the corrected-image data by comparing the corrected-image data with a predetermined threshold, an error-calculation unit which calculates an error of the current pixel based on the corrected-image data and a result of the binarization, and an error-correction unit which corrects errors of surrounding pixels when the result of the binarization of the current pixel represents a predetermined one of either a black dot or a white hole.

27 Claims, 22 Drawing Sheets

FIG. 4

| 1 | 2 | 1 |
|---|---|---|
| 2 | * | |

FIG. 8

| INPUT-MULTI-LEVEL-IMAGE DATA<br>dxy | ERROR-CORRECTION VALUE<br>V(dxy) |
|---|---|
| 0 | 0 |
| 1 | 30 |
| 2 | 25 |
| 3 | 20 |
| 4~10 | 10 |
| 10~20 | 5 |
| 20~ | 0 |

FIG. 16

| INPUT-MULTI-LEVEL-IMAGE DATA d×y | ERROR-CORRECTION VALUE V(d×y) | NUMBER OF ERROR-CORRECTED PIXELS C(d×y) |
|---|---|---|
| 0 | 0 | 0 |
| 1 | 20 | 10 |
| 2 | 15 | 8 |
| 3 | 12 | 7 |
| 4~10 | 10 | 5 |
| 10~20 | 5 | 3 |
| 20~ | 0 | 0 |

IMAGE QUALITY IN ERROR DIFFUSION SCHEME

BACKGROUND OF THE INVENTION

1. Field of the Invention

The present invention relates to an image processing device which binarizes multi-level image data by using a least average error scheme or an error diffusion scheme.

2. Description of the Related Art

When there is a need to output multi-level image data via a printer device only capable of outputting binary data or when the amount of data needs to be reduced for the sake of a storage-capacity reduction or a transfer-speed enhancement, a binarizing process is performed to decrease the number of gray levels associated with each pixel. There are various schemes to achieve such a binarizing process. Among these, an error diffusion scheme and a least average error scheme are widely used since these schemes permit a high image resolution and a continuous gray-level control.

In recent years, an increasing number of inkjet printers have been manufactured as an item suitable for a personal use. These inkjet printers usually employ either one of these two schemes described above as a binarizing process.

The error diffusion scheme uses a quantization error generated during a process of binarizing a given pixel, and distributes the quantization error to surrounding pixels which are not yet subjected to a binarizing process. The distribution of the quantization error is performed by attaching respective weights. The least average error scheme corrects an image-data value of a given pixel by using a weighted average of quantization errors generated at surrounding pixels when the surrounding pixels are binarized. The error diffusion scheme and the least average error scheme are logically equivalent to each other, the only difference being a timing as to when an error diffusion process is performed.

As a publicly known example of the error diffusion scheme and the least average error scheme, Japanese Patent Laid-open Application No. 7-226841 may be referred to. In general, the least average error scheme corrects a multi-level-image-data value of a given pixel by adding weighted errors of surrounding pixels which are already binarized, and, then, binarizes the corrected value by using a predetermined threshold value. An error generated during this binarizing process is to be spread to surrounding pixels which are not yet binarized. First, a method of obtaining an error for a given pixel will be described.

For the sake of explanation, a main scan in the present invention runs from the left to the right in the image, and a sub-scan runs from the top to the bottom. FIG. 4 is an illustrative drawing showing an example of a weight matrix.

A symbol "*" in FIG. 4 indicates a current pixel. Errors obtained from binarized pixels are multiplied by respective weights of the matrix, and a total of the errors is calculated with respect to the surrounding binarized pixels. Then, the total is divided by a sum of all the matrix weights. In this manner, an error to be used for correcting an image value of the current pixel is obtained by standardizing the errors of the surrounding binarized pixels.

What is described above can be represented by the following equation.

$$D_{xy} = d_{xy} + \Sigma((e_{x+i,y+j} \cdot w_{i,j}) / \Sigma w_{i,j})$$

Here, x and y are coordinates of the current pixel, and i and j are coordinates with reference to the weight matrix (i and j are 0 and 0 for the current pixel, and are negative with respect to any positions on the left or the top of the current pixel). Further, the following gives a description of the rest of the symbols used in the above equation.

$d_{xy}$: image data of the current pixel $e_{x+i,y+j}$: error of a surrounding pixel $w_{ij}$: a weight of the weight matrix $D_{xy}$: corrected data Next, a method of binarizing the corrected data will be described. In the binarizing method, the corrected image data $D_{xy}$ is binarized by using a predetermined threshold value T. When $D_{xy}$ is smaller than T, an output is 0, and when $D_{xy}$ is greater or equal to T, the output is 1. Here, the output takes a value of 1 when $D_{xy}$ is equal to T. Even if the output is set to 0 for $D_{xy}$ equal to T, however, no significant difference is observed in the output image.

What is described above can be represented as follows:

IF $D_{xy} < T$

THEN $O_{xy} = 0$

ELSE $O_{xy} = 1$, where T is a threshold value, and $O_{xy}$ is output binary data.

Finally, a method of obtaining an error of the current pixel will be described. This method calculates an error of the current pixel based on the corrected data $D_{xy}$ and the output data $O_{xy}$. In general, when $O_{xy}$ is zero, $D_{xy}$ per se is treated as the error. When $O_{xy}$ is 1, $D_{xy}$ minus a maximum value of the input image data is treated as the error. This is represented as follows:

$$e_{xy} = D_{xy} - O_{xy} \cdot d_{max},$$

where $d_{max}$ is a maximum value among the input image data.

According to the theory of the binarizing, a binarizing process can be achieved by the above-described methods such that level information of the entire image is preserved between the input image and the output image.

As described above, the least average error scheme and the error diffusion scheme have excellent characteristics as a binarizing process. As is described in Japanese Patent Laid-open Application No. 7-226841, however, when density of dots generated by the binarizing process is sparse, dots are not evenly distributed, so that unevenly connected dots are generated to cause image degradation. An artifact generated in such a manner is generally called a worm.

There are two different cases in which dots are sparse. One is when the an optical level of the image is low, and the other is when the optical level of the image is high. When the image data is represented by 8 bits with the whitest level being 0and the blackest level being 255, for example, an image portion having a value thereof close to zero is a portion where the level is low (no dot is printed for a pixel having a value of zero). When the least average error scheme or the error diffusion scheme is applied to this image portion, the resulting image portion ends up having black dots scarcely scattered.

An image portion having a value thereof close to 255 is a portion where the level is high (a potion having a value of 255 is completely darkened in black). Such a portion ends up having white holes sparsely scattered against the black background. White holes are generally not referred to as white dots. In the output image, however, they look like white dots printed against a black background. In such a portion, worms as previously described are observed. In ordinary inkjet printers, white holes do not appear where the image level is high. This is because a size of a dot is relatively large in comparison to the image resolution of the printer, and, also, because ink tends to be spread and becomes blurry. In inkjet printers, thus, the problem as described above is not generally observed.

FIG. 5 is an illustrative drawing showing an example of an output image obtained by applying the least average error scheme or the error diffusion scheme to an image portion where the image level is low.

Japanese Patent Laid-open Application No. 7-226841 attends to this problem by enlarging a size of the weight matrix (which is referred to as an error-diffusion matrix in this document). An experiment conducted by the inventor of the present invention showed, however, that worms were not completely eliminated even though an enlargement of the weight matrix size had some improving effect.

Even when a larger size weight matrix is used only for part of the image, hardware implementation of the least average error scheme or the error diffusion scheme leads to a cost increase because of a need for a larger memory volume for storing errors.

Accordingly, there is a need for an image processing device which can attain an improved image quality when multi-level image data is binarized by the least average error scheme or the error diffusion scheme.

There is another need for an image processing device which can attain improved image quality by use of a simple device structure in which correction of an error value is made by subtracting a predetermined value from the error value with the corrected value being switched depending on the input multi-level data.

There is still another need for an image processing device which can attain an improved image quality and preserve a continuity of image levels by enhancing a dot spreading effect, which is achieved by making stronger correction (increasing the extent to which the errors are lowered in the entirety of image) as the input multi-level data approaches closer to the lowest level so as to have a stronger effect on a highlight portion where worms would be conspicuous.

There is yet another need for an image processing device which can attain an improved image quality by changing the number of corrected pixels.

There is further another need for an image processing device which can attain an improved image quality by enhancing a dot spreading effect, which is achieved by making stronger correction (increasing the extent to which the errors are lowered in the entirety of image) as the input multi-level data approaches closer to the lowest level so as to have a stronger effect on a highlight portion where worms would be conspicuous.

There is still another need for an image processing device which can change not only the number of corrected pixels but also the correction values, so that the amount of computation is decreased to enhance the processing speed.

SUMMARY OF THE INVENTION

Accordingly, it is a general object of the present invention to provide an image processing device which can satisfy the needs described above.

It is another and more specific object of the present invention to provide an image processing device which can attain an improved image quality when multi-level image data is binarized by the least average error scheme or the error diffusion scheme.

It is still another object of the present invention to provide an image processing device which can attain improved image quality by use of a simple device structure in which correction of an error value is made by subtracting a predetermined value from the error value with the corrected value being switched depending on the input multi-level data.

It is yet another object of the present invention to provide an image processing device which can attain an improved image quality and preserve a continuity of image levels by enhancing a dot spreading effect, which is achieved by making stronger correction (increasing the extent to which the errors are lowered in the entirety of image) as the input multi-level data approaches closer to the lowest level so as to have a stronger effect on a highlight portion where worms would be conspicuous.

It is further another object of the present invention to provide an image processing device which can attain an improved image quality by changing the number of corrected pixels.

It is still another object of the present invention to provide an image processing device which can attain an improved image quality by enhancing a dot spreading effect, which is achieved by making stronger correction (increasing the extent to which the errors are lowered in the entirety of image) as the input multi-level data approaches closer to the lowest level so as to have a stronger effect on a highlight portion where worms would be conspicuous.

It is yet another object of the present invention to provide an image processing device which can change not only the number of corrected pixels but also the correction values, so that the amount of computation is decreased to enhance the processing speed.

In order to achieve the above objects according to the present invention, an image processing device for converting multi-level-image data into binary-image data by using one of a least average error method and an error diffusion method includes an image-data-correction unit which corrects multi-level-image data of a current pixel by adding thereto an error diffused from surrounding binarized pixels so as to output corrected-image data, a binarizing unit which binarizes the corrected-image data by comparing the corrected-image data with a predetermined threshold, an error-calculation unit which calculates an error of the current pixel based on the corrected-image data and a result of the binarization, and an error-correction unit which corrects errors of surrounding pixels when the result of the binarization of the current pixel represents a predetermined one of either a black dot or a white hole.

According to one aspect of the present invention, the image processing device as described above is such that the error-correction unit corrects the errors of surrounding pixels when the result of the binarization of the current pixel represents a black dot.

According to another aspect of the present invention, the image processing device as described above is such that the error-correction unit corrects the errors of surrounding pixels to an extent that varies depending on the multi-level-image data of the current pixel.

According to another aspect of the present invention, the image processing device as described above is such that the error-correction unit corrects the errors of surrounding pixels by subtracting a value from the errors, the value varying depending on how large the multi-level-image data of the current pixel is.

According to another aspect of the present invention, the image processing device as described above is such that the value is larger as the multi-level-image data of the current pixel decreases.

According to another aspect of the present invention, the image processing device as described above is such that the error-correction unit corrects the errors of surrounding pixels, a number of the surrounding pixels varying depending on the multi-level-image data of the current pixel.

According to another aspect of the present invention, the image processing device as described above is such that the number of the surrounding pixels is larger as the multi-level-image data of the current pixel decreases.

According to another aspect of the present invention, the image processing device as described above is such that the error-correction unit corrects the errors of surrounding pixels by subtracting a value from the errors, the value varying depending on how large the multi-level-image data of the current pixel is.

According to another aspect of the present invention, the image processing device as described above is such that the value is larger as the multi-level-image data of the current pixel decreases.

Other objects and further features of the present invention will be apparent from the following detailed description when read in conjunction with the accompanying drawings.

BRIEF DESCRIPTION OF THE DRAWINGS

FIG. 4 is an illustrative drawing showing an example of a weight matrix;

FIG. 8 is a table chart showing relations between input-multi-level-image data and an error correction value;

FIG. 16 is a table chart showing relations between input-multi-level-image data, an error correction value, and a number of error-corrected pixels;

DESCRIPTION OF THE PREFERRED EMBODIMENTS

In the following, embodiments of the present invention will be described with reference to the accompanying drawings.

Figure 1:
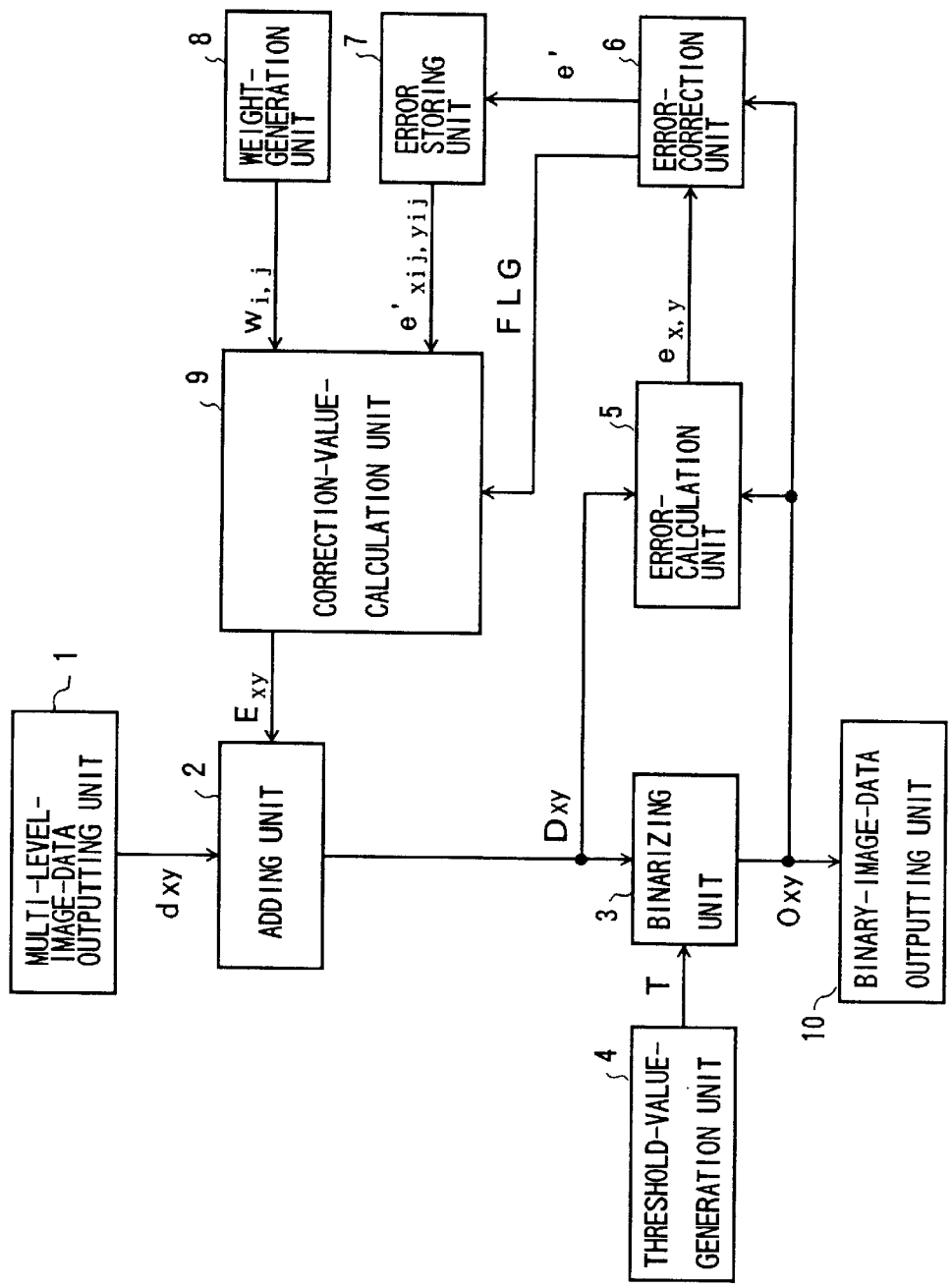
FIG. 1 is a block diagram of a least-average-error processing unit according to an embodiment of the present invention.

FIG. 1 is a block diagram of a least-average-error processing unit according to an embodiment of the present invention. Processing of image data is started at the top left corner of the image to proceed in the main-scan direction (horizontal direction). After a completion of processing of one line, processing of a next line is started (by shifting in the sub-scan direction).

In what follows, elements shown in the figure will be described. A multi-level-image-data outputting unit 1 outputs input-multi-level-image data dxy. An adding unit 2 adds an input-pixel-correction value Exy to the input-multi-level-image data dxy to obtain corrected image data Dxy. A binarizing unit 3 compares the corrected image data Dxy with the threshold value T to carry out a binarizing process. A threshold-value-generation unit 4 generates the threshold value T. An error-calculation unit 5 obtains an error of a current pixel identified by a pixel coordinate (x, y) by using the corrected image data Dxy and the binarization result Oxy.

An error-correction unit 6 corrects errors of the current pixel and pixels located on the left of the current pixel based on the binarization result Oxy. An error storing unit 7 stores obtained errors exy. A weight-generation unit 8 stores a weight matrix, and supplies a respective weight wij. A correction-value-calculation unit 9 multiplies errors ex+i,y+j of the surrounding pixels by the weights wij, and checks a status of FLG to correct a correction value of the input-multi-level-image data (an error of a pixel next on the right to the current pixel).

Figure 2:
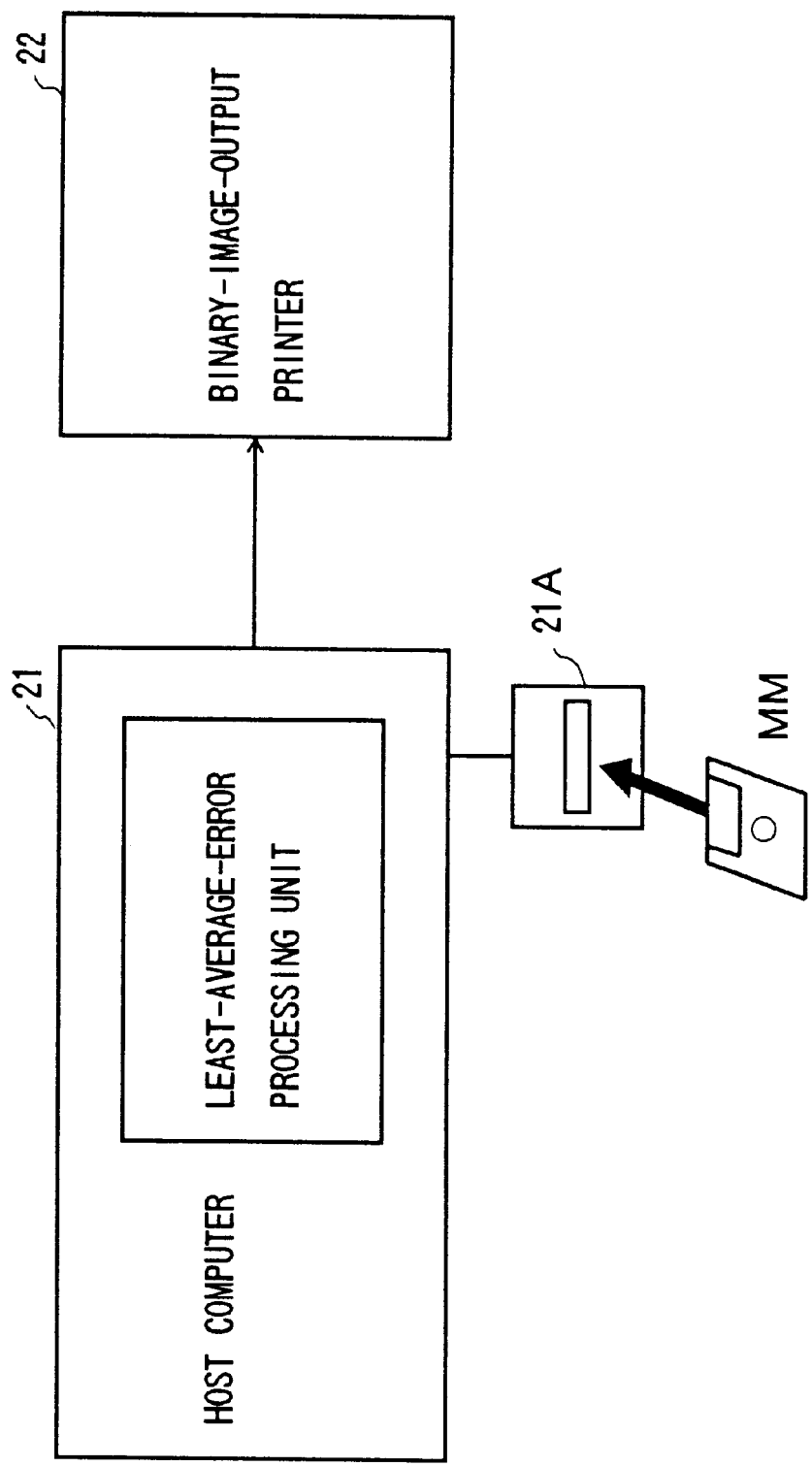
FIG. 2 is a block diagram showing a system configuration of the embodiment of the present invention.

FIG. 2 is a block diagram showing a system configuration of the embodiment of the present invention. In the embodiment of the present invention, a host computer 21 includes the least-average-error processing unit implemented by means of software. Processing results of the least-average-error processing unit are sent to a binary-image-output printer 22, where a binary image is printed. Such a system configuration is cost effective, and, because of this reason, is widely used in application of inkjet printers for a personal use. This system configuration can be modified to provide many different configurations.

In detail, the least-average-error processing unit may be implemented as part of a device driver, which is a software package installed at a time when the binary-image-output printer 22 is connected to the host computer 21, and necessary settings are made for using the printer 22. Such a device driver may be supplied by way of a memory medium such as a CD-ROM or the like. In the figure, a memory medium MM includes a program recorded therein for causing the host computer 21 to provide a function of the device driver including a function of the least-average-error processing unit. The memory medium MM is inserted into a drive 21a, so that the program stored in the memory medium MM is loaded to the host computer 21. After the loading of the program, the host computer 21 executes the program to provide the function of the least-average-error processing unit.

Figure 4:
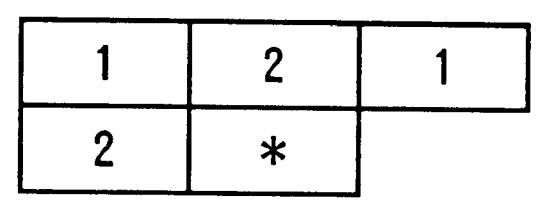

FIG. 4 is an illustrative drawing showing a weight matrix according to the embodiment of the present invention. As previously described, the symbol "*" indicates a current pixel.

Numbers shown in the figure correspond to the weights of respective pixels. It should be noted that a configuration of the weight matrix may be different from case to case.

Figure 7A:
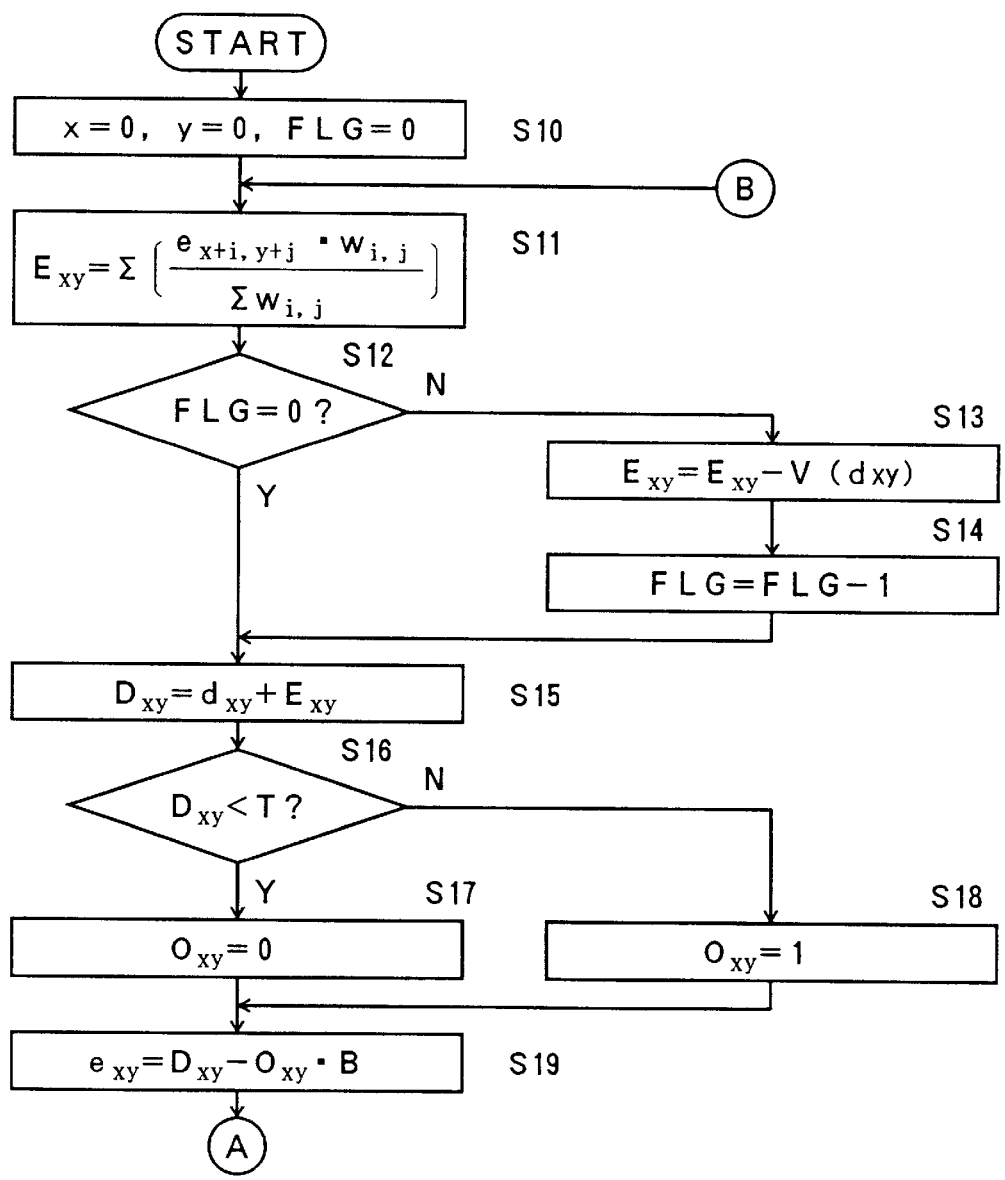
FIGS. 7A and 7B are a flowchart of the least-average-error method according to the first embodiment of the present invention.
Figure 7B:
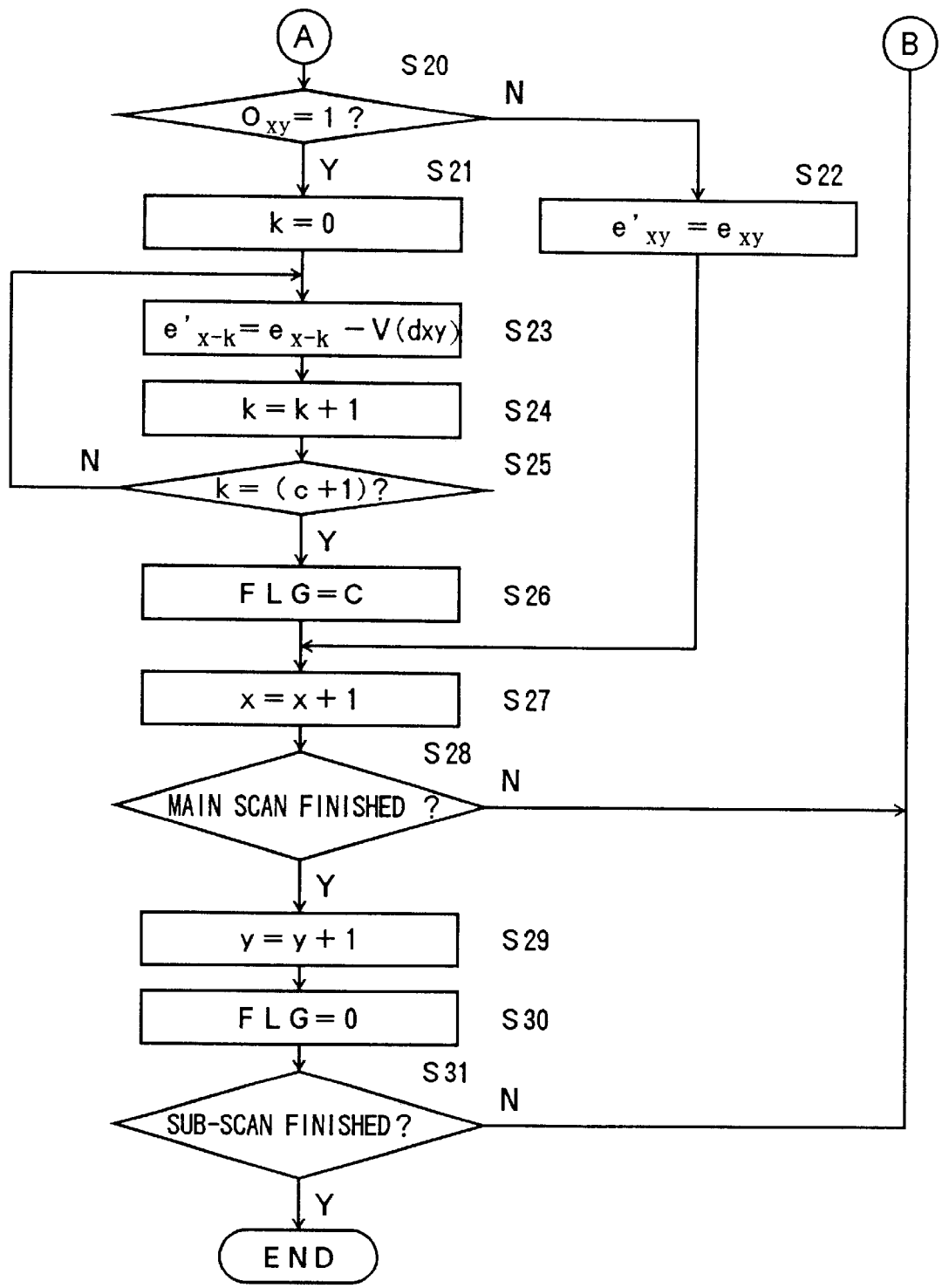

FIGS. 7A and 7B are a flowchart of the least-average-error method according to the embodiment of the present invention. In what follows, processes of the embodiment of the present invention will be described with reference to these figures. Prior to a start of the processes, a pixel counter x in the main-scan direction and a line counter y in the sub-scan direction are set to an initial value "0", and FLG is initialized (step S10). Then, the correction-value-calculation unit 9 multiplies errors e'x+i,y+j of binarized pixels by corresponding weights of the weight matrix when these errors are read from the error storing unit 7 and the weights are read from the weight-generation unit 8. The correction-value-calculation unit 9 further adds the weighted errors together, and divides the total by a sum of all the weights of the weight matrix to obtain the correction value Exy (step S11). By using the weight matrix of FIG. 4, the correction value Exy is represented by the following.

$$Exy=(ex-1,y-1\times 1+ex,y-1\times 2+ex+1, y-1\times 1+ex-1,y\times 2)/6$$

If FLG is not zero (N at step S12), a value V(dxy) (i.e., the value of V is dependent on dxy) which is a predetermined value corresponding to each input-multi-level data is subtracted from the correction value Exy (step S13). FLG is decreased by 1 (step S14). This process is equivalent to a correction of an error with respect to a pixel next on the right to a given pixel when the given pixel previously scanned has a binarization result Oxy being 1 (i.e., an ON state). In the present embodiment, the correction is made to a correction value of the input-multi-level-image data. It should be noted, however, that even if the correction is made directly to the input-multi-level-image data in the same manner, this will lead to the same result.

After this, the input-multi-level-image data dxy and the correction value Exy are added together by the adding unit 2 to obtain the corrected data Dxy (step S15).

A binarizing process by the binarizing unit 3 for binarizing the corrected pixel data Dxy based on the threshold value T gives output-binary-image data Oxy which is zero (step S17) when Dxy is smaller than T (Y at step S16), and gives output-binary-image data Oxy which is 1 (step S18) when Dxy is no less than T (N at the step S16).

Subsequently to the above, the error-calculation unit 5 calculates an error exy of the current pixel based on the corrected pixel data Dxy, the output-binary-image data Oxy, and a predetermined value B (step S19). Here, the value B is the same as the possible maximum value of the input gray levels (i.e. the blackest level). When the input-multi-level-image data is represented by 8 bits per pixel, for example, the value B is 255.

The error-correction unit 6 stores the value exy as a corrected error value e'xy without any change in the error storing unit 7 (step S22) when the binarization result Oxy is 0 (i.e., no dot is printed) (N at step S20). When the binarization result Oxy is 1 (i.e., a dot is printed) (Y at step S20), on the other hand, the value V(dxy) is subtracted from the error exy of the current pixel, and, also, is subtracted from errors ex-k obtained for pixels scanned prior to the current pixel and located on the left of the current pixel, so that corrected error values e'x-k are obtained (step S23). In this case, k is an integer between 1 and C. If k is allowed to take a value of zero, it means that an error of the current pixel is also taken into consideration. In this manner, error correction is performed with respect to the current pixel as well as pixels located on the left of the current pixel. Further, in order to correct errors with respect to an error value on the right of the current pixel, FLG is set to C (step S26).

Following to this, the pixel counter x of the main-scan direction is incremented (step S27). After processing of the current pixel is completed, a check is made as to whether processing is finished with respect to a main-scan line (step S28). If it is not yet finished (N at the step S28), a next pixel on the right is subjected to the processing. If the among processing of the main-scan line is finished (Y at the step S28), the line counter y is incremented (step S29). A check is then made as to whether processing in the sub-scan direction is completed (step S31). If it is not completed (N at the step S31), FLG is cleared, and a next line (beneath the current line) is processed. If processing of all lines is finished (Y at the step S31), processing of the image comes to an end.

FIG. 8 is a table chart showing relations between the input-multi-level-image data dxy and the error correction value V(dxy). As shown in the figure, the smaller the input-multi-level-image data (the lower the image level), the larger the correction value V(dxy).

Figure 18A:
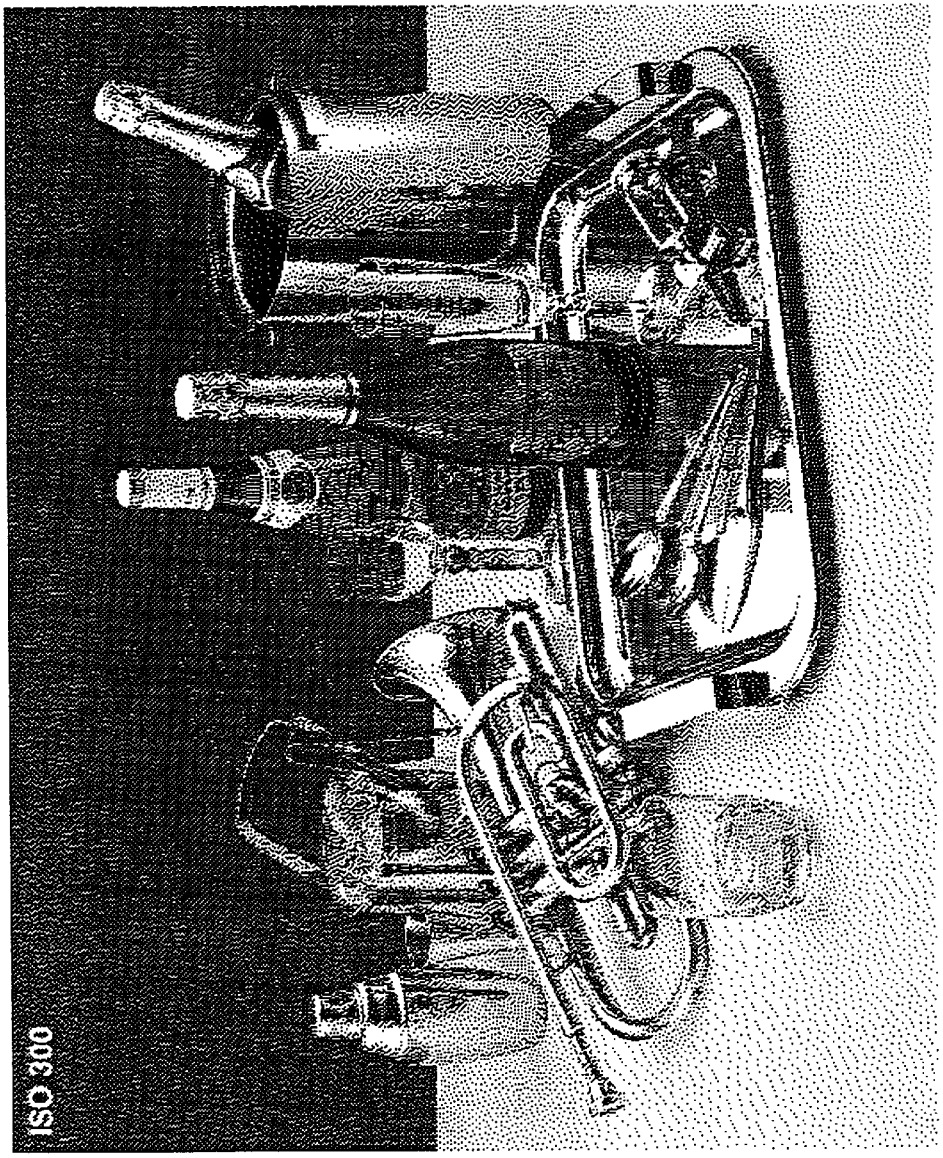
FIGS. 18A and 18B are images demonstrating improved results of the present invention.
Figure 18B:

FIGS. 18A and 18B are images demonstrating improved results of the present invention. FIG. 18A is an image printed by using binary image data which is converted from multi-value image data according to a related-art least average error scheme. As can be seen from the figure, worms are present in highlight portions of the image.

FIG. 18B shows an image printed by using binary image data which is converted from multi-value image data according to the least average error method of the present invention. As described above, the least average error method according to the present invention corrects errors of surrounding pixels when a binarization result of the current pixel is 1. This achieves an even distribution of printed dots in highlight portions of an image, as shown in FIG. 18B. In terms of dot distribution, the image of FIG. 18B has a higher image quality than that of FIG. 18A.

Figure 6:
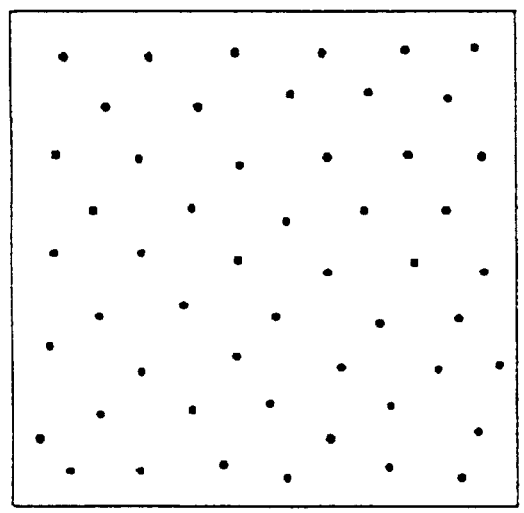
FIG. 6 is an illustrative drawing showing an example of an output image obtained by the present invention even when density of dots generated from a binarization process is rather sparse.

As described above, the image processing device for converting multi-level-image data into binary-image data via a least average error method corrects errors of pixels located on either left or right side of a current pixel by means of a subtraction operation when a binarization result of the current pixel is 1 (ON). Since an effect of a negative error is given to the pixels located on the left of the current pixel, an image having a nice spread of dots as shown in FIG. 6 is obtained even when the density of the dots generated from the binarization process is rather sparse. Also, how much is subtracted from an error is changed depending on the value of the input-multi-level-image data, so that error correction can be optimal to each input-multi-level data, thereby producing a high-quality image.

Further, since the correction value is larger toward the lowest image level, optimal correction is achieved, and, also, a continuity of image levels is maintained.

This embodiment has been described with reference to a case in which the least average error scheme is employed. Use of the error diffusion scheme in place of the least average error scheme brings about the same result theoretically, and choice of a scheme is not limited by any means. The least average error scheme and the error diffusion scheme have variations such as one which adds random noise to the threshold value, one which changes the threshold value by use of a dither matrix, one which changes the direction of the line processing at every line, etc. This embodiment can be applied in any one of these variations, and is not limited to particular variations.

This embodiment has also been described with reference to a case in which the least average error scheme is implemented via software. It should be noted, however, that hardware implementation is also an option, and the present invention is not limited to either one of these two forms of implementation. In the present invention, a specific number is not disclosed with respect to the number C of corrected pixels (It should be noted that the total number of corrected pixels will be 2C+1 when dots are printed). The number C and the value V(dxy) are preferably determined based on experiments in which images are actually printed. According to the experiments which the inventor of the present invention conducted, only a limited improvement was observed when these number and value were small. As they became larger, more improvement was found. When they became too large, however, too much correction was observed. Since an optimal number and an optimal value vary depending on the type and size of the weight matrix used, it is preferable to determine the number and value through experiments under the conditions to which the present embodiment is applied.

In what follows, a second embodiment of the present invention will be described.

Figure 3:
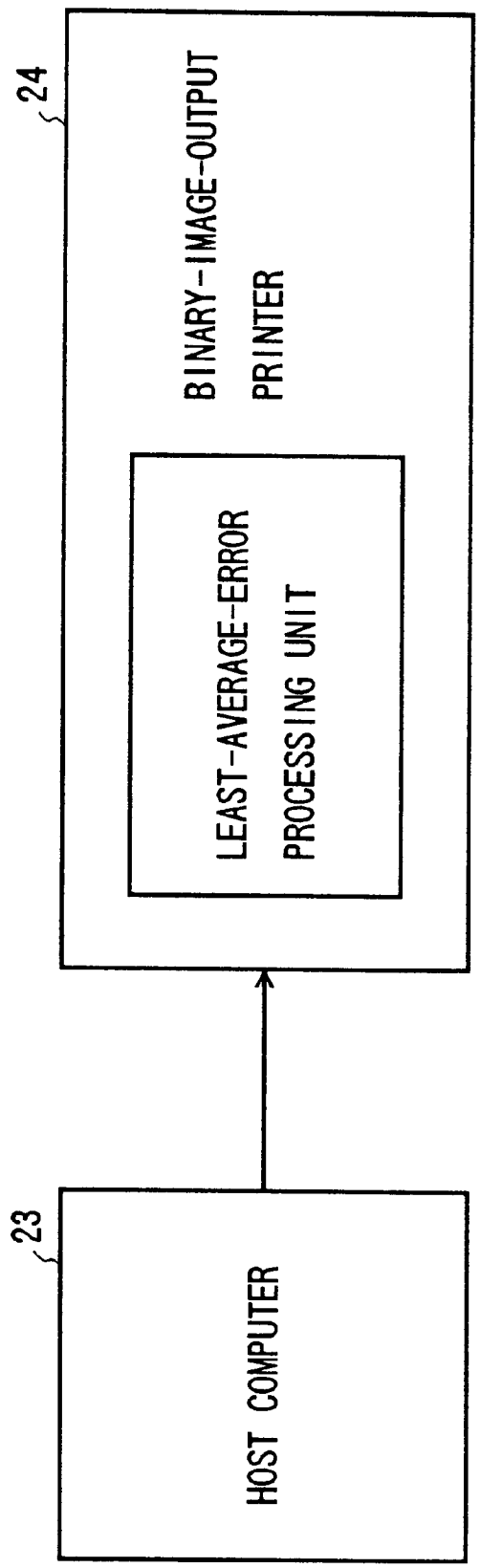
FIG. 3 is a block diagram showing a system configuration of a second embodiment of the present invention.
Figure 5:
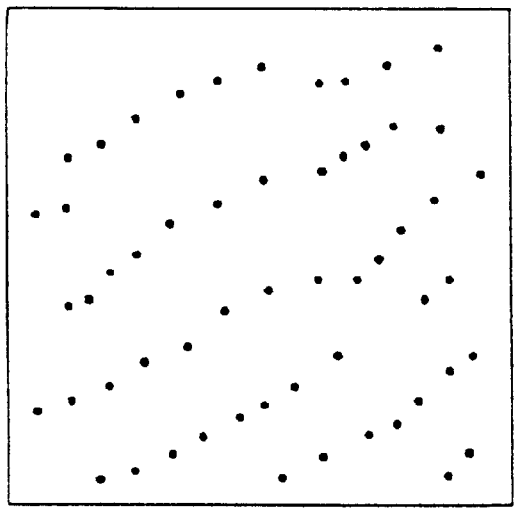
FIG. 5 is an illustrative drawing showing an example of an output image obtained by applying a least average error scheme or an error diffusion scheme to an image portion where an image level is low.

In the first embodiment, the least average error scheme of the present invention was implemented by means of software. In the second embodiment, the scheme is implemented by using hardware. FIG. 3 is a block diagram showing a system configuration of this embodiment.

A binary-image-output printer 24 includes a least-average-error processing unit implemented by means of hardware. A host computer 23 communicates with the binary-image-output printer 24 by using a page-description language or the like such as Postscript. The binary-image-output printer 24 expands the communicated data, and applies the least average error scheme so as to output a binary image. Such a system configuration is advantageous in terms of an operation speed thereof, and is often used in electro-photograph-type printers.

A configuration of the present embodiment is the same as that of the first embodiment, and is shown in FIG. 1. The error-calculation unit 5, the error-correction unit 6, the error storing unit 7, and the correction-value-calculation unit 9 will be described with regard to a detailed configuration thereof.

Figure 9:
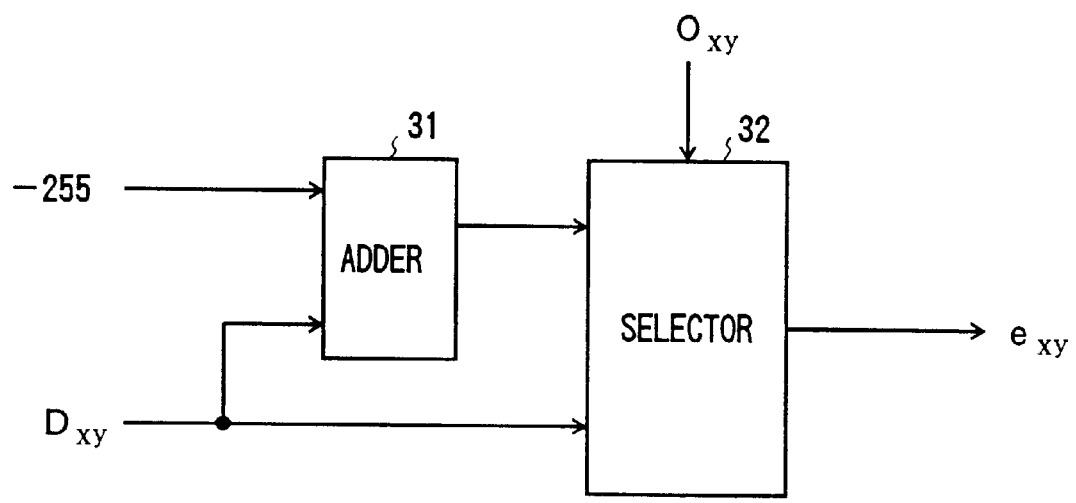
FIG. 9 is a block diagram of an error-calculation unit.

FIG. 9 is a block diagram of the error-calculation unit 5. An adder 31 adds −255 to the corrected image data Dxy, and a selector 32 selects an output of the adder 31 when the binarization result Oxy is 1 (dot on). When the binarization result Oxy is 0 (dot off), on the other hand, the corrected image data Dxy is selected. The selected one is output as the error exy.

Figure 10:
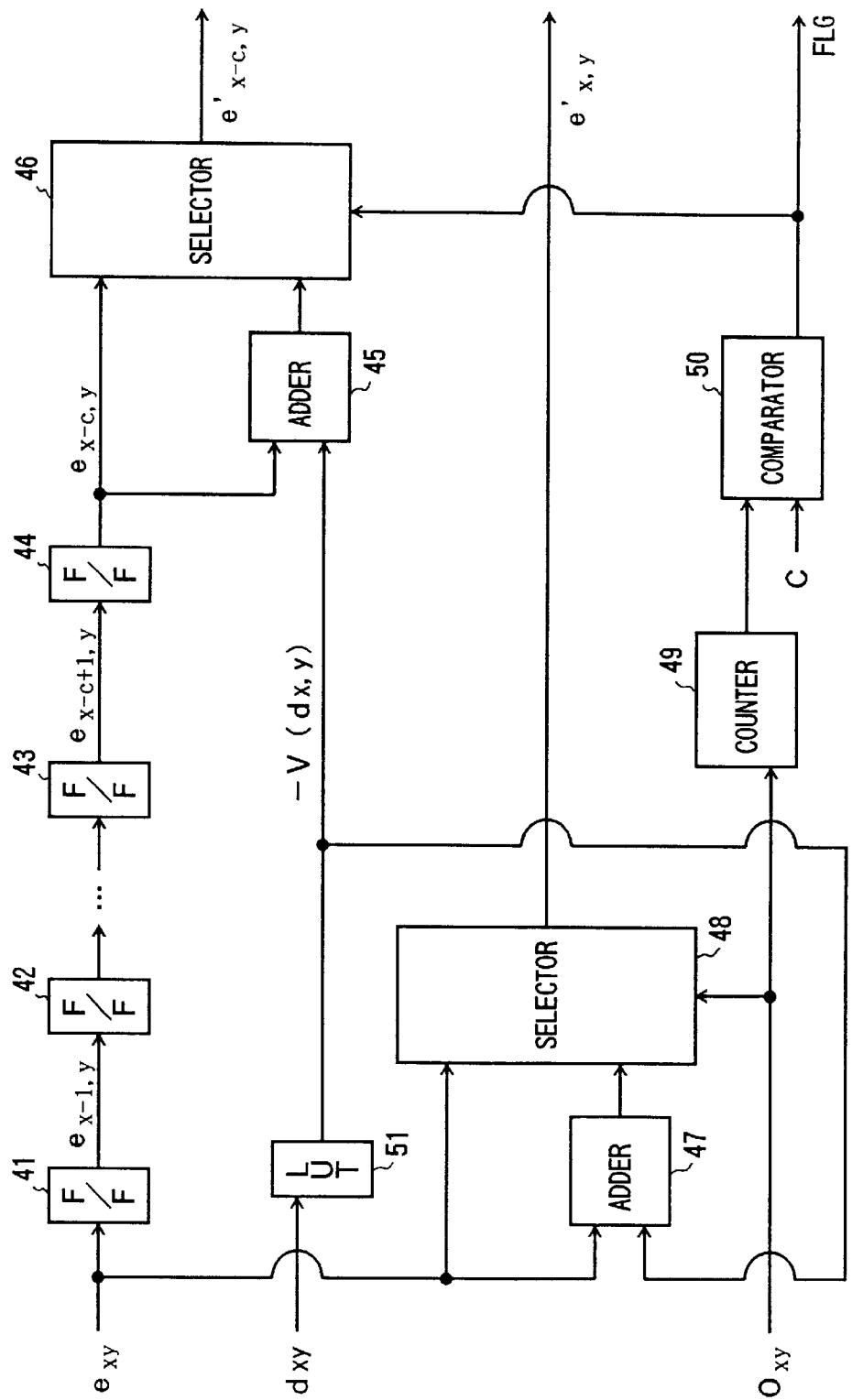
FIG. 10 is a block diagram of an error-correction unit.

FIG. 10 is a block diagram of the error-correction unit 6. Flip-flops 41 through 44 latch the error e. The total number of the flip-flops 41 through 44 are a predetermined number C in the present embodiment while only four of them are shown in the figure for the sake of clarity, and these flip-flops serve as a shift register for storing errors e with respect to C pixels. An adder 45 adds an error ex-c,y and −V(dxy) together when −V(dxy) is supplied from a LUT 51.

A selector 46 selects the error ex-c,y when FLG is 0 (off), and selects the sum of the error ex-c,y and −V when FLG is 1 (on). The selected value is output as a corrected error e'x-c,y. A adder 47 adds the error exy of the current pixel and −V together.

A selector 48 selects the error exy when the binarization result Oxy is 0 (dot off), and selects the sum of the error exy and -V when the binarization result Oxy is 1 (dot on). The selected value is output as a corrected error e'xy. A counter 49 loads zero when the binarization result Oxy is 1 (dot on), and counts up the loaded number one by one. When the count becomes C+1, the counter 49 stops counting.

A comparator 50 compares the count of the counter 49 with the number C, and turns on a FLG signal if the count of the counter 49 is smaller than the number C. A LUT 51 supplies −V(dxy) in accordance with the input-multi-level-image data dxy.

Figure 11:
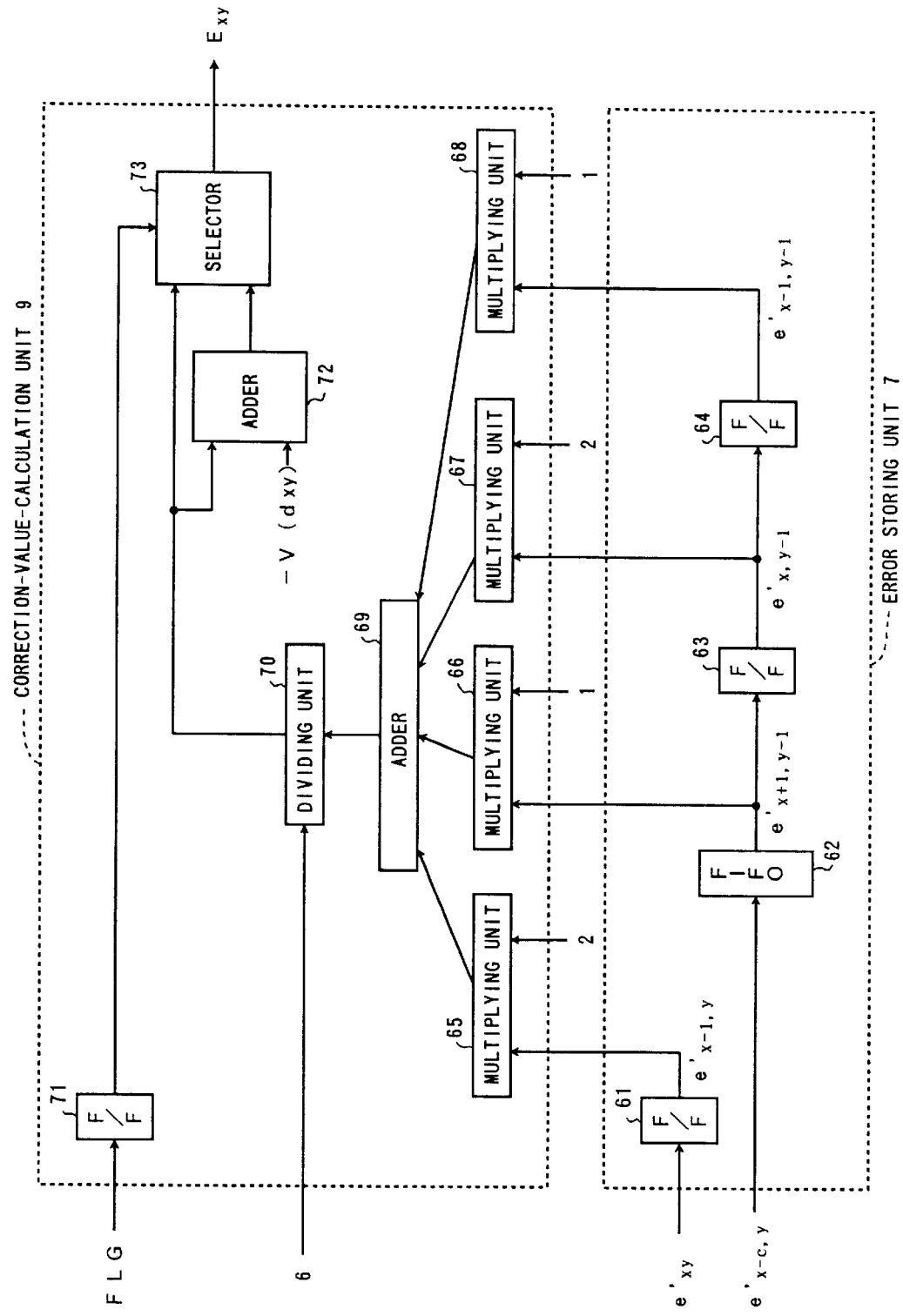
FIG. 11 is a block diagram showing configurations of an error storing unit and a correction-value-calculation unit.

FIG. 11 is a block diagram showing configurations of the error storing unit 7 and the correction-value-calculation unit 9. A flip-flop 61 latches the corrected error e'xy. A FIFO (first in first out) 62 is a line memory with a memory capacity for storing one-line's worth of corrected errors e'. Flip-flops 63 and 64 latch corrected errors e' with respect to pixels one line before the current pixel when the corrected errors e' are read from the FIFO 62. Multiplying units 65 through 68 multiply the corrected errors e' of pixels surrounding the current pixel by weight coefficients of the weight matrix. An adder 69 adds outputs of the multiplying units 65–68 together.

A dividing unit 70 divides an output of the adder 69 by a sum of all the weights of the weight matrix (which is 6). A flip-flop 71 latches the FLG signal output from the error-correction unit 6, and delays the FLG signal by one-pixel's worth of time. The reason why the FLG signal should be delayed is as follows. When the FLG signal is generated, the current pixel is at coordinate (x, y). The FLG signal is provided for a check purpose, and indicates whether to process C pixels starting from a pixel at (x+1, y) next to the current pixel positioned at (x, y) when a binarization result of the current pixel value is 1 (on). Because of this, one-pixel's worth of delay is necessary.

An adder 72 adds −V to the result of the dividing operation output from the dividing unit 70. A selector 73 selects the output of the dividing unit 70 when FLG is 0 (off), and selects an output of the adder 72 when FLG is 1 (on). The selected value is output as the correction value Exy.

Figure 12A:
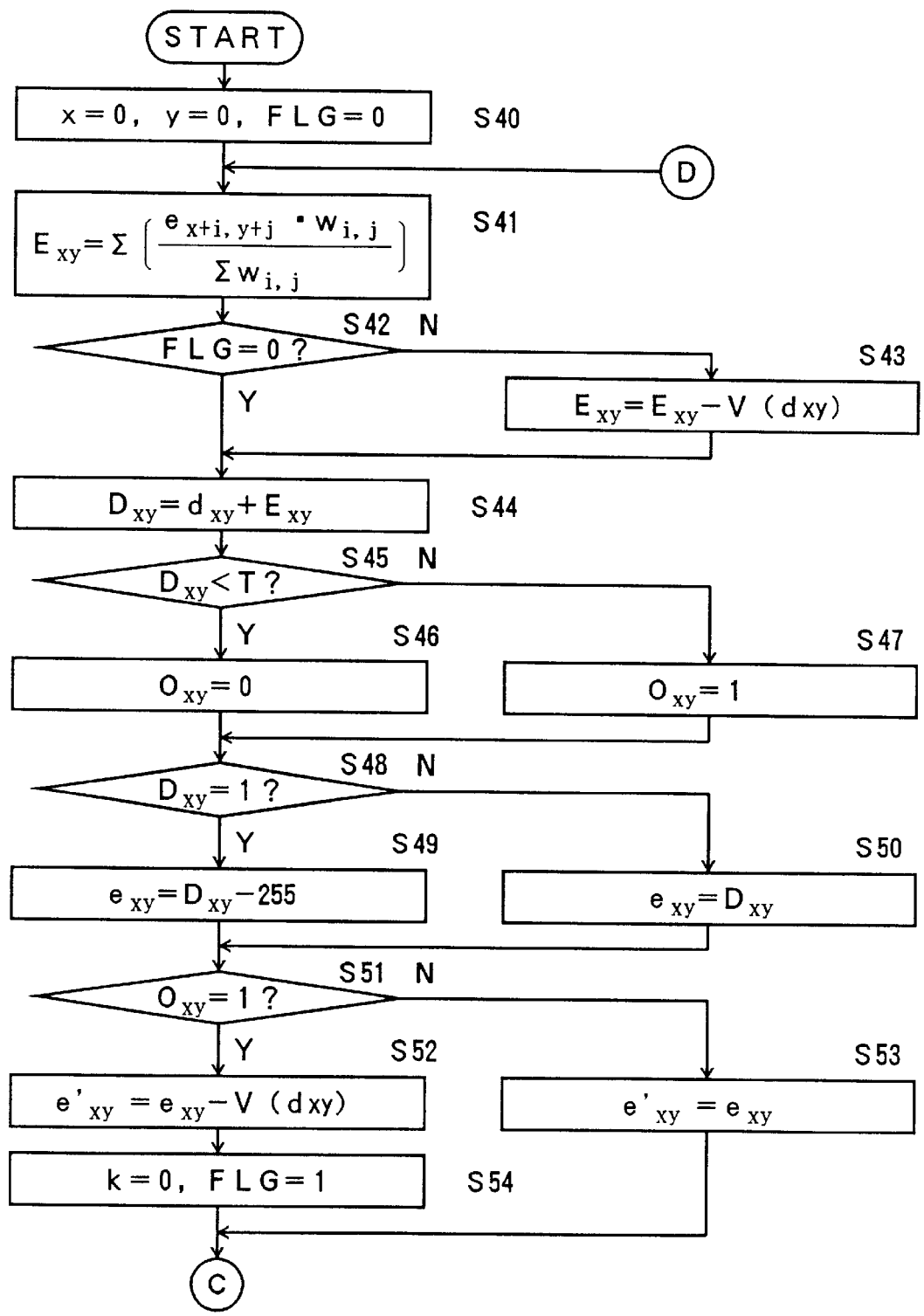
FIGS. 12A and 12B are a flowchart showing a procedure of the second embodiment.
Figure 12B:
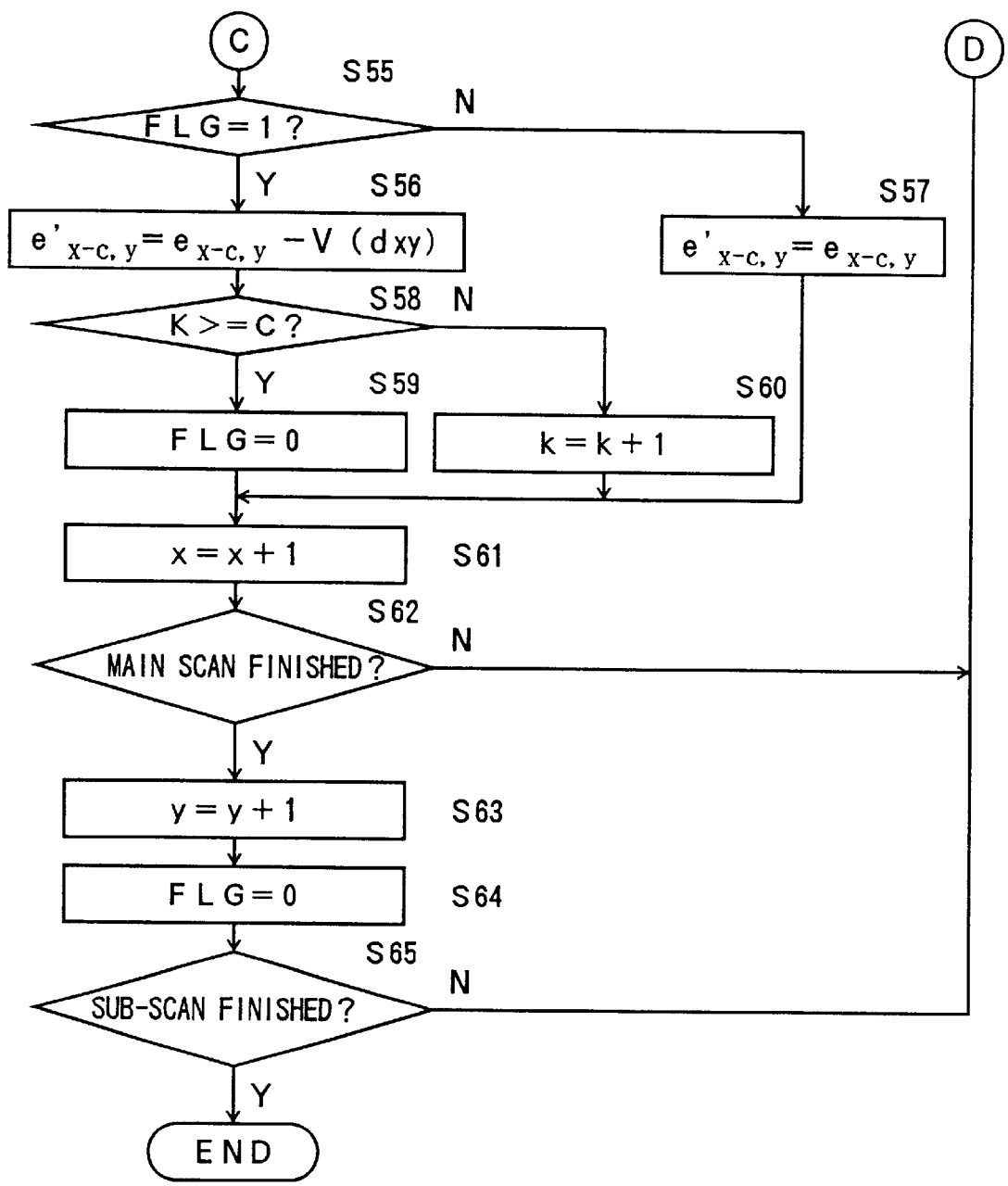

FIGS. 12A and 12B are a flowchart showing a procedure of the second embodiment. Prior to starting the procedure, the pixel counter x of the main-scan direction and the line counter y of the sub-scan direction are initialized to "0", and, also, the FLG signal is initialized (set to an off-status) (step S40). Then, the multiplying unit 68 of the correction-value-calculation unit 9 multiplies the corrected error e'x-1,y-1 by 1 when this corrected error of a binarized pixel is read from the error storing unit 7. By the same token, the multiplying unit 67 multiplies e'x,y-1 by 2, and the multiplying unit 66 multiplies e'x+1,y-1 by 1. Also, the multiplying unit 65 multiplies e'x-1,y by 2. Outcomes of these multiplications are added together by the adder 69. The obtained sum is divided by 6 by the dividing unit 70, so that the correction value Exy is obtained (step S41). As is in the first embodiment, the correction value Exy is represented as:

$$Exy=(ex-1,y-1\times 1+ex,y-1\times 2+ex+1, y-1\times 1+ex-1,y\times 2)/6$$

If FLG is not zero (N at a step S42), the adder 72 adds the predetermined value −V(dxy) to Exy where each predetermined value −V(dxy) is provided with respect to corresponding input-multi-level data (step S43). As previously described, this process is equivalent to a correction of an error with respect to a pixel next on the right to a given pixel when the given pixel previously scanned has a binarization result Oxy being 1 (i.e., an ON state). In the present embodiment, the correction is made to a correction value of the input-multi-level-image data. It should be noted, however, that even if the correction is made directly to the input-multi-level-image data in the same manner, this will lead to the same result.

After this, the input-multi-level-image data dxy and the correction value Exy are added together by the adding unit 2 to obtain the corrected data Dxy (step S44). The binarizing unit 3 then binarizes the corrected pixel data Dxy by using the predetermined threshold value T. This binarizing process gives output-binary-image data Oxy which is zero (step S46) when Dxy is smaller than T (Y at step S45), and gives output-binary-image data Oxy which is 1 (step S47) when Dxy is no less than T (N at the step S45).

The selector 32 selects a sum of Dxy and −255 obtained by the adder 31 so as to supply the selected sum as the error exy (step S49) when the binarization result Oxy is 1 (dot on) (N at the step S48). When the binarization result Oxy is 0 (dot off) (Y at the step S48), on the other hand, Dxy is selected and supplied as the error exy (step S50).

After this, the selector 48 stores the value exy as a corrected error value e'xy without any change in the error storing unit 7 (step S53) when the binarization result Oxy is 0 (dot off) (N at step S51). When the binarization result Oxy is 1 (dot on) (Y at the step S51), on the other hand, a sum of the error exy of the current pixel and −V(dxy) is stored as e'xy in the error storing unit 7 (step S52) as the sum is obtained by the adder 47. When the binarization result Oxy becomes 1 (dot on), also, the counter 49 is cleared, and starts counting (step S54). The comparator 50 turns on an output (FLG signal) thereof in response to the change in the count of the counter 49. The FLG signal keeps an on-status thereof until C pixels are processed after starting from a pixel where the binarization result Oxy became 1 (dot on).

The selector 46 selects a sum of the error ex-c,y and −V(dxy) obtained by the adder 45 so as to output the sum as a corrected error e'x-c,y (step S56) when the FLG signal is 1 (on) (Y at step S55). When the FLG signal is 0 (off) (N at the step S55), on the other hand, the error ex-c,y is selected and output as the corrected error e'x-c,y (step S57). In this embodiment, errors on the left of the current pixel and an error of the current pixel are corrected in the following manner. Namely, the correction is made to a pixel at coordinate (x-C, y) while the processing of the current pixel is underway. As the position of the current pixel is shifted one by one, the correction is made to one pixel after another until it reaches the pixel (the original current pixel) where the binarization result Oxy became 1 (on).

The corrected error e'x-c,y of the corrected pixel is stored in the FIFO 62. The corrected error e'xy of the current pixel is delayed by one pixel via the flip-flop 61 after the corrected error e'xy is output from the selector 48. The corrected error e'xy with the delay is to be used in obtaining the correction value Ex+1,y of the next coordinate (x+1,y), and is not stored in the FIFO 62 at this point of time.

Then, the pixel counter x of the main-scan direction is incremented (step S61). This marks the end of the process for one pixel.

After the completion of the processing of one pixel, a check is made as to whether processing is finished with respect to a main-scan line (step S62). If it is not yet finished (N at the step S62), a next pixel on the right is subjected to the processing. If the processing of the main-scan line is finished (Y at the step S62), the line counter y is incremented (step S63). A check is then made as to whether processing in the sub-scan direction is completed (step S65). If it is not completed (N at the step S65), FLG is cleared, and a next line (beneath the current line) is processed. If processing of all lines is finished (Y at the step S65), processing of the image comes to an end.

As described above, the image processing device for converting multi-level-image data into binary-image data via a least average error method corrects errors of pixels located on either left or right side of a current pixel by means of a subtraction operation when a binarization result of the current pixel is 1 (ON). Since an effect of a negative error is given to the pixels located on the left of the current pixel, an image having a nice spread of dots as shown in FIG. 6 is obtained even when the density of the dots generated from the binarization process is rather sparse. In the hardware implementation of the least average error scheme, a large error-diffusion matrix is not used, and corrections are made only to errors on the same line as that of the current pixel. This configuration requires a minimum number of line memories, thereby offering a cost advantage.

This embodiment has been described with reference to a case in which the least average error scheme is employed. Use of the error diffusion scheme in place of the least average error scheme brings about the same results theoretically. The least average error scheme and the error diffusion scheme have variations such as one which adds random noise to the threshold value, one which changes the threshold value by use of a dither matrix, one which changes the direction of the line processing at every line, etc. This embodiment can be applied in any one of these variations, and is not limited to particular variations.

Figure 13:
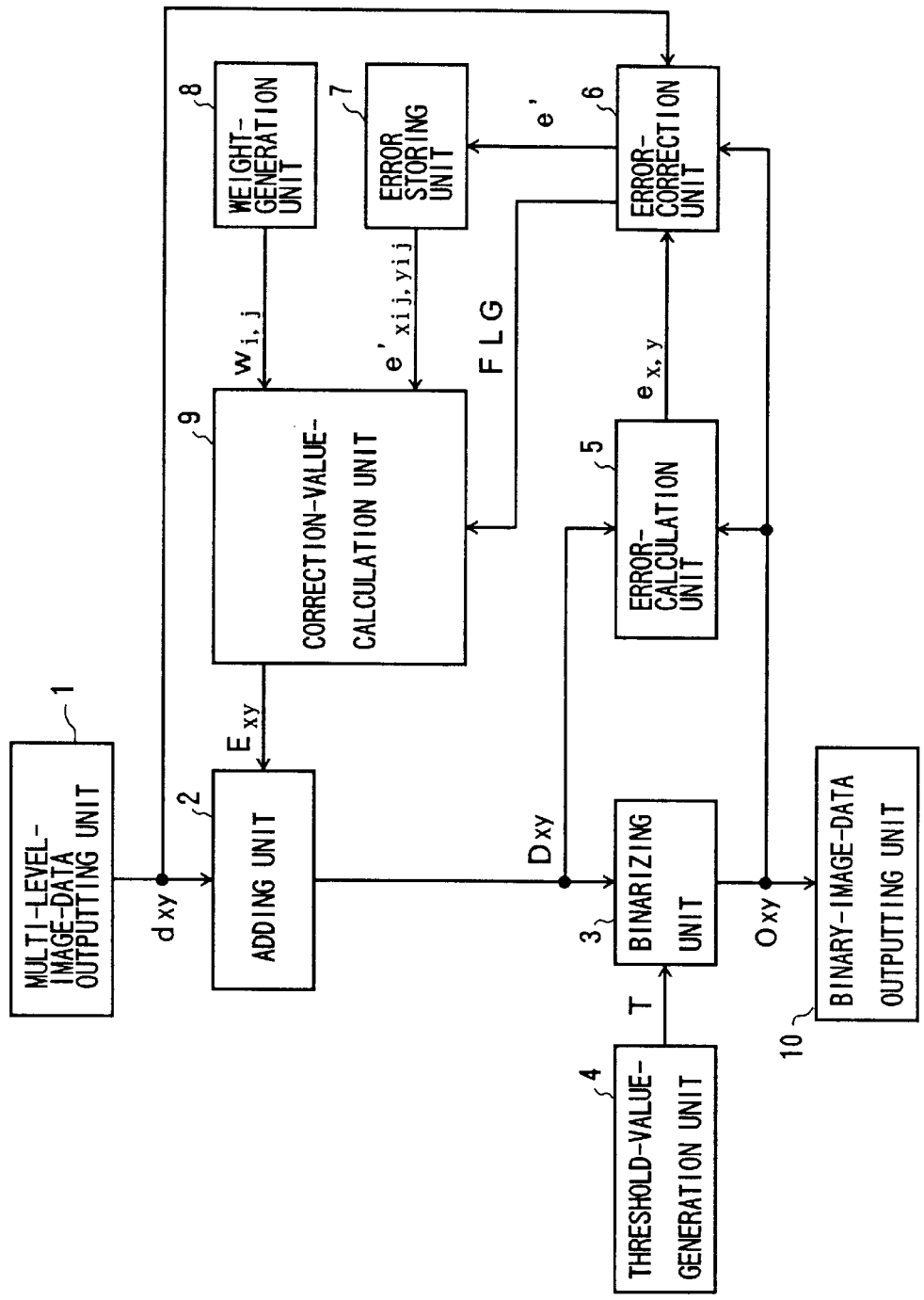
FIG. 13 is a block diagram showing a configuration of a third embodiment

In what follows, a third embodiment of the present invention will be described. FIG. 13 is a block diagram showing a configuration of the third embodiment. Since this configuration is almost identical to that of the first embodiment, a description will be omitted if it would be a substantial duplicate of what has already been described. FIG. 13 shows a least-average-error processing unit according to the third embodiment.

The weight-generation unit 8 stores a weight matrix, and supplies respective weights. The correction-value-calculation unit 9 multiplies errors ex+i,y+j of surrounding pixels by respective weights Wxy, and, also, checks the FLG status so as to correct correction values of the input-multi-level-image data (errors of the pixels located on the left of the current pixel).

A system configuration of this embodiment is shown in FIG. 2, and the weight matrix is shown in FIG. 4.

Figure 14A:
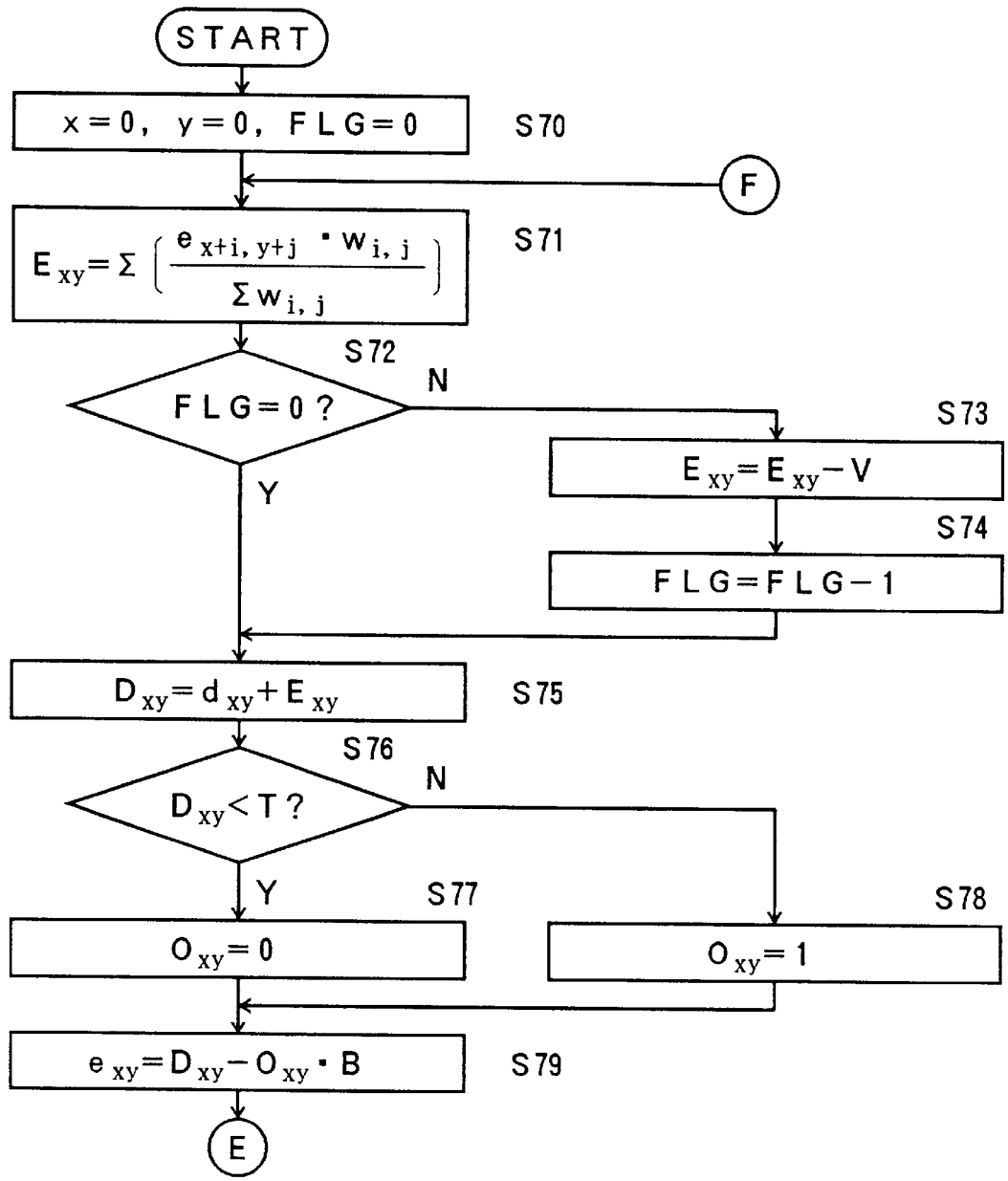
FIGS. 14A and 14B are a flowchart of a procedure of the third embodiment.
Figure 14B:
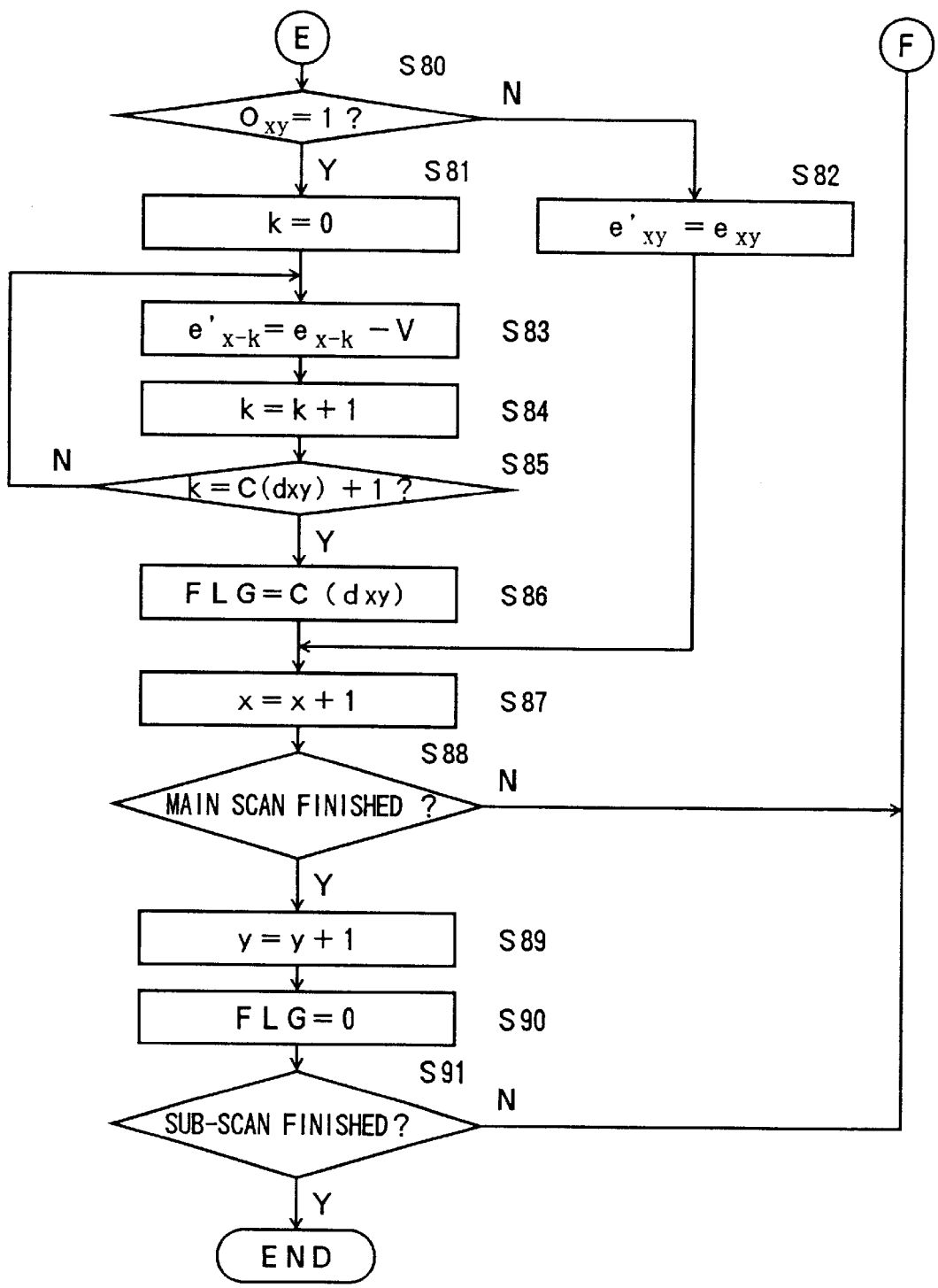

FIGS. 14A and 14B are a flowchart of a procedure of the third embodiment. Prior to a start of the procedure, a pixel counter x in the main-scan direction and a line counter y in the sub-scan direction are set to an initial value "0", and FLG is initialized (step S70). Then, the correction-value-calculation unit 9 multiplies errors e'x+i,y+j of binarized pixels by corresponding weights of the weight matrix when these errors are read from the error storing unit 7 and the weights are read from the weight-generation unit 8. The correction-value-calculation unit 9 further adds the weighted errors together, and divides the total by a sum of all the weights of the weight matrix to obtain the correction value Exy (step S71). This process of obtaining the correction value Exy is the same as that of the first embodiment.

If FLG is not zero (N at step S72), a predetermined value V is subtracted from the correction value Exy (step S73), and FLG is decreased by 1 (step S74). This process is equivalent to a correction of an error with respect to a pixel next on the right to a given pixel when the given pixel previously scanned has a binarization result Oxy being 1 (i.e., an ON state). In the present embodiment, the correction is made to a correction value of the input-multi-level-image data. It should be noted, however, that even if the correction is made directly to the input-multi-level-image data in the same manner, this will lead to the same result.

After this, the input-multi-level-image data dxy and the correction value Exy are added together by the adding unit 2 to obtain the corrected data Dxy (step S75). A binarizing process by the binarizing unit 3 for binarizing the corrected pixel data Dxy based on the threshold value T gives output-binary-image data Oxy which is zero (step S77) when Dxy is smaller than T (Y at step S76), and gives output-binary-image data Oxy which is 1 (step S78) when Dxy is no less than T (N at the step S76).

Subsequently to the above, the error-calculation unit 5 calculates an error exy of the current pixel based on the corrected pixel data Dxy, the output-binary-image data Oxy, and a predetermined value B (step S79). Here, the value B is the same as the possible maximum value of the input gray levels (i.e. the blackest level). When the input-multi-level-image data is represented by 8 bits per pixel, for example, the value B is 255.

The error-correction unit 6 stores the value exy as a corrected error value e'xy without any change in the error storing unit 7 (step S82) when the binarization result Oxy is 0 (dot off) (N at step S80). When the binarization result Oxy is 1 (dot on) (Y at step S80), on the other hand, the value V is subtracted from the error exy of the current pixel, and, also, is subtracted from errors ex-k obtained for C(dxy) pixels scanned prior to the current pixel and located on the left of the current pixel, so that corrected error values e'x-k are obtained (step S83). In this case, k is an integer no smaller than 1, and the number C(dxy) of the pixels on the left of the current pixel depends on the input-multi-level-image data dxy. If k is allowed to take a value of zero, it means that an error of the current pixel is also taken into consideration. In this manner, error correction is performed with respect to the current pixel as well as the pixels located on the left of the current pixel. Further, in order to correct errors with respect to an error value on the right of the current pixel, FLG is set to C(dxy) (step S86). Following to this, the pixel counter x of the main-scan direction is incremented (step S87). This ends the processing of one pixel.

After processing of the current pixel is completed, a check is made as to whether processing is finished with respect to a main-scan line (step S88). If it is not yet finished (N at the step S88), a next pixel on the right is subjected to the processing. If the processing of the main-scan line is finished (Y at the step S88), the line counter y is incremented (step S89). A check is then made as to whether processing in the sub-scan direction is completed (step S91). If it is not completed (N at the step S91), FLG is cleared, and a next line (beneath the current line) is processed. If processing of all lines is finished (Y at the step S91), processing of the image comes to an end.

FIG. 16 is a table chart showing relations between the input-multi-level-image data dxy and the number C(dxy) of error-corrected pixels (the total number of corrected pixels will be 2C+1 when dots are printed in the present invention). As shown in the figure, C(dxy) is larger to achieve a stronger correction as the input-multi-level-image data (image level) is decreased.

As described above, the image processing device for converting multi-level-image data into binary-image data via a least average error method corrects errors of pixels located on either left or right side of a current pixel by means of a subtraction operation when a binarization result of the current pixel is 1 (ON). Since an effect of a negative error is given to the pixels located on the left of the current pixel, an image having a nice spread of dots as shown in FIG. 6 is obtained even when the density of the dots generated from the binarization process is rather sparse. Also, how much is subtracted from an error is changed depending on the value of the input-multi-level-image data, so that error correction can be optimal to each input-multi-level data, thereby producing a high-quality image. Since a stronger correction is effected as the image level is decreased, an optimal correction is achieved while maintaining a continuity of gray levels.

This embodiment has been described with reference to a case in which the least average error scheme is employed. Use of the error diffusion scheme in place of the least average error scheme brings about the same results theoretically. The least average error scheme and the error diffusion scheme have variations such as one which adds random noise to the threshold value, one which changes the threshold value by use of a dither matrix, one which changes the direction of the line processing at every line, etc. This embodiment can be applied in any one of these variations, and is not limited to particular variations.

This embodiment has also been described with reference to a case in which the least average error scheme is implemented via software. It should be noted, however, that hardware implementation is also an option, and the present invention is not limited to either one of these two forms of implementation. In the present invention, a specific number is not disclosed with respect to the error correction value V. The number C(dxy) and the value V are preferably determined based on experiments in which images are actually printed. According to the experiments which the inventor of the present invention conducted, only a limited improvement was observed when these number and value were small. As they became larger, more improvement was found. When they became too large, however, too much correction was observed. Since an optimal number and an optimal value vary depending on the type and size of the weight matrix used, it is preferable to determine the number and value through experiments under the conditions to which the present embodiment is applied.

In the following, a fourth embodiment of the present invention will be described. A block diagram, a system configuration, and a weight matrix of this embodiment are the same as those of the third embodiment.

Figure 15A:
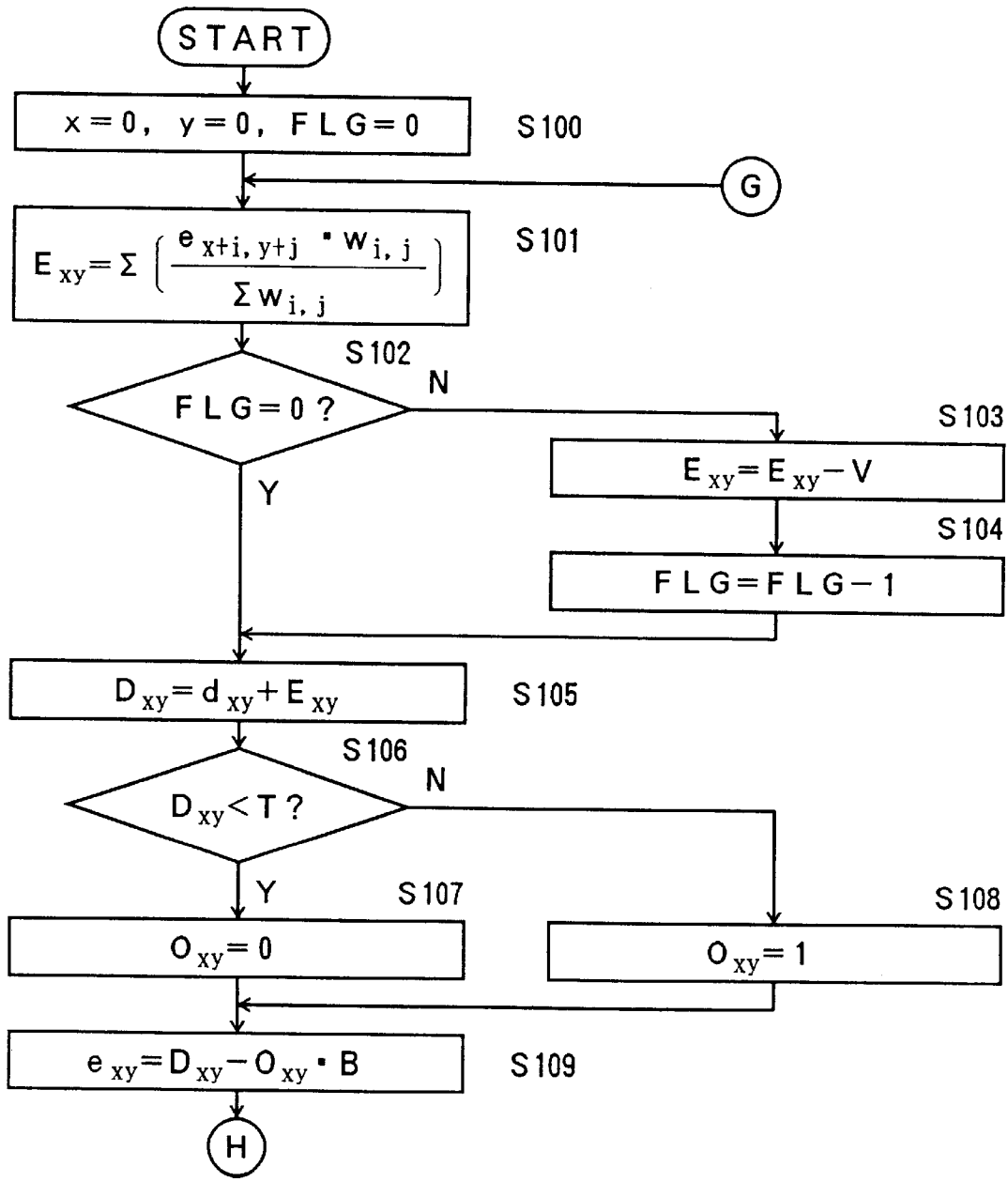
FIGS. 15A and 15B are a flowchart of a procedure of a fourth embodiment.
Figure 15B:
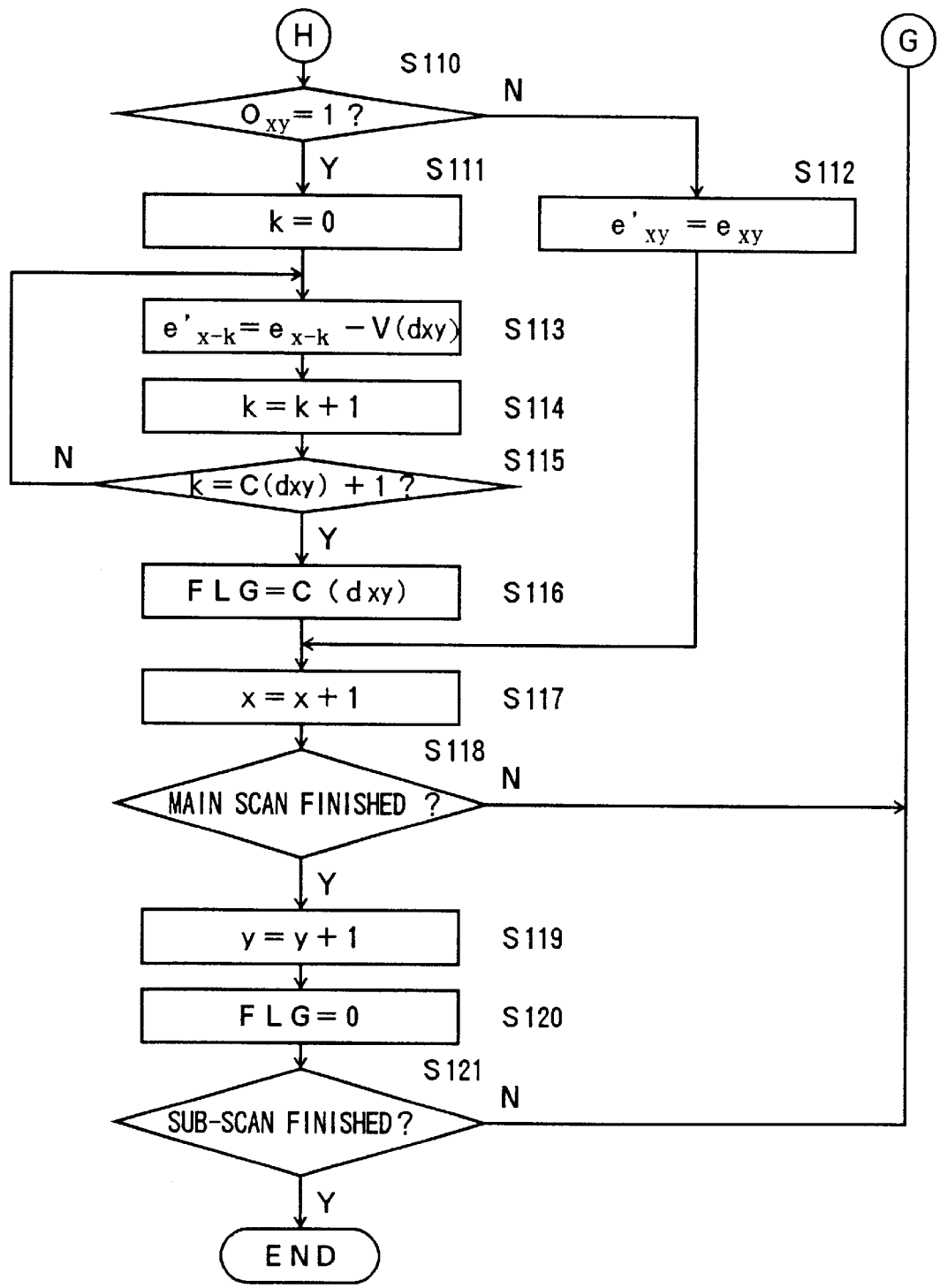

FIGS. 15A and 15B are a flowchart of a procedure of the fourth embodiment. Prior to a start of the procedure, a pixel counter x in the main-scan direction and a line counter y in the sub-scan direction are set to an initial value "0", and FLG is initialized (step S100). Then, the correction-value-calculation 9 multiplies errors e'x+i,y+j of binarized pixels by corresponding weights of the weight matrix when these errors are read from the error storing unit 7 and the weights are read from the weight-generation unit 8. The correction-value-calculation unit 9 further adds the weighted errors together, and divides the total by a sum of all the weights of the weight matrix to obtain the correction value Exy (step S101). By using the weight matrix of FIG. 4, the correction value Exy is represented by the following.

$$Exy=(ex-1,y-1\times 1+ex,y-1\times 2+ex+1, y-1\times 1+ex-1,y\times 2)/6$$

If FLG is not zero (N at step S102), a predetermined value V is subtracted from the correction value Exy (step S103), and FLG is decreased by 1 (step S104). This process is equivalent to a correction of an error with respect to a pixel next on the right to a given pixel when the given pixel previously scanned has a binarization result Oxy being 1 (i.e., an ON state). In the present embodiment, the correction is made to a correction value of the input-multi-level-image data. It should be noted, however, that even if the correction is made directly to the input-multi-level-image data in the same manner, this will lead to the same result.

After this, the input-multi-level-image data dxy and the correction value Exy are added together by the adding unit 2 to obtain the corrected data Dxy (step S105). A binarizing process by the binarizing unit 3 for binarizing the corrected pixel data Dxy based on the threshold value T gives output-binary-image data Oxy which is zero (step S107) when Dxy is smaller than T (Y at step S106), and gives output-binary-image data Oxy which is 1 (step S108) when Dxy is no less than T (N at the step S106).

Subsequently to the above, the error-calculation unit 5 calculates an error exy of the current pixel based on the corrected pixel data Dxy, the output-binary-image data Oxy, and a predetermined value B (step S109). Here, the value B is the same as the possible maximum value of the input gray levels (i.e. the blackest level). When the input-multi-level-image data is represented by 8 bits per pixel, for example, the value B is 255.

The error-correction unit 6 stores the value exy as a corrected error value e'xy without any change in the error storing unit 7 (step S112) when the binarization result Oxy is 0 (dot off) (N at step S110). When the binarization result Oxy is 1 (dot on) (Y at step S110), on the other hand, the value V(dxy) is subtracted from the error exy of the current pixel, and, also, is subtracted from errors ex-k obtained for C(dxy) pixels scanned prior to the current pixel and located on the left of the current pixel, so that corrected error values e'x-k are obtained (step S113). In this case, k is an integer no smaller than 1, and the number C(dxy) of the pixels on the left of the current pixel depends on the input-multi-level-image data dxy. If k is allowed to take a value of zero, it means that an error of the current pixel is also taken into consideration. In this manner, error correction is performed with respect to the current pixel as well as the pixels located on the left of the current pixel. Further, in order to correct errors with respect to an error value on the right of the current pixel, FLG is set to C(dxy) (step S116). Following to this, the pixel counter x of the main-scan direction is incremented (step S117). This ends the processing of one pixel.

After processing of the current pixel is completed, a check is made as to whether processing is finished with respect to a main-scan line (step S118). If it is not yet finished (N at the step S118), a next pixel on the right is subjected to the processing. If the processing of the main-scan line is finished (Y at the step S118), the line counter y is incremented (step S119). A check is then made as to whether processing in the sub-scan direction is completed (step S121). If it is not completed (N at the step S121), FLG is cleared, and a next line (beneath the current line) is processed. If processing of all lines is finished (Y at the step S121), processing of the image comes to an end.

FIG. 16 is a table chart showing relations between the input-multi-level-image data dxy, the error correction value V(dxy), and the number C(dxy) of error-corrected pixels (the total number of corrected pixels will be 2C+1 when dots are printed in the present invention).

As shown in the figure, V(dxy) and C(dxy) are larger to achieve a stronger correction as the input-multi-level-image data (image level) becomes smaller.

As described above, the image processing device for converting multi-level-image data into binary-image data via a least average error method corrects errors of pixels located on either left or right side of a current pixel by means of a subtraction operation when a binarization result of the current pixel is 1 (ON). Since an effect of a negative error is given to the pixels located on the left of the current pixel, an image having a nice spread of dots as shown in FIG. 6 is obtained even when the density of the dots generated from the binarization process is rather sparse. Also, how much is subtracted from an error is changed depending on the value of the input-multi-level-image data, so that error correction can be optimal to each input-multi-level data, thereby producing a high-quality image. Since both the number of corrected pixels and the correction value are controlled in accordance with the input-multi-level data, a highly accurate adjustment is made to each correction value. Control of not only the number of pixels but also the correction value makes it possible to reduce the number of pixels actually corrected, thereby resulting in a reduction in the amount of computation.

Further, since correction is stronger toward the lowest level of image data, an optimal correction is achieved while maintaining a continuity of gray levels.

This embodiment has been described with reference to a case in which the least average error scheme is employed. However, use of the error diffusion scheme in place of the least average error scheme is completely acceptable. The least average error scheme and the error diffusion scheme have variations such as one which adds random noise to the threshold value, one which changes the threshold value by use of a dither matrix, one which changes the direction of the line processing at every line, etc. This embodiment can be applied in any one of these variations, and is not limited to particular variations.

This embodiment has also been described with reference to a case in which the least average error scheme is implemented via software. It should be noted, however, that hardware implementation is also an option, and the present invention is not limited to either one of these two forms of implementation.

The embodiments in the above description have been given with regard to a configuration which includes a host computer and a printer connected to each other. The present invention is not limited to this configuration, and may be implemented as part of a copier machine, for example.

Figure 17:
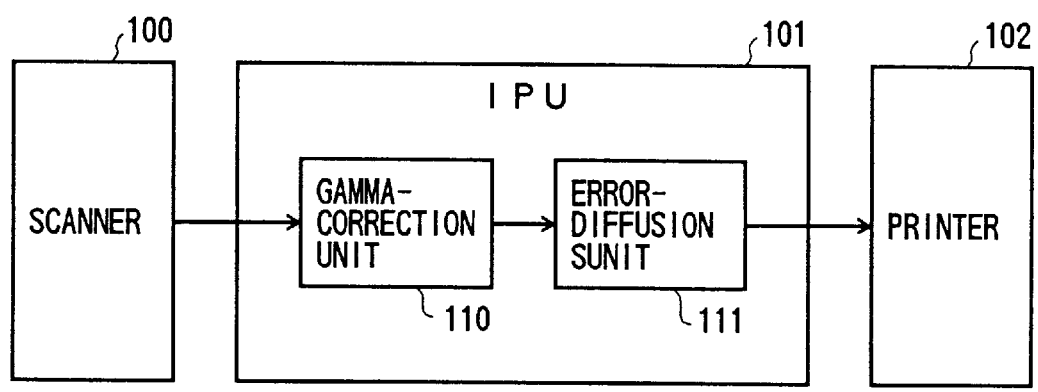
FIG. 17 is a block diagram of a copier machine according to the present invention.

FIG. 17 is a block diagram of a copier machine according to the present invention. The copier machine of FIG. 17 includes a scanner 100, an image processing unit 101, and a printer 102. The scanner 100 scans an image on a document, and provides image data for the image processing unit 101. The image processing unit 101 attends to various processes of image processing to generate image data ready to be printed. This image data is supplied to the printer 102, where an image is printed based on the supplied image data.

The image processing unit 101 includes a gamma-correction unit 110 and an error-diffusion unit 111. The gamma-correction unit 110 carries out a gamma correction to take into account scanner characteristics and printer characteristics. The error-diffusion unit 111 performs the error-diffusion process (i.e., the least-average-error process) of the present invention, so that the multi-value image data supplied from the scanner 100 is converted into binary image data, which has an improved image quality in accordance with the teachings of the present invention, and is ready to be printed by the printer 102.

Further, the present invention is not limited to these embodiments, but various variations and modifications may be made without departing from the scope of the present invention.

The present application is based on Japanese priority application No. 9-356206 filed on Dec. 8, 1997, with Japanese Patent Office, the entire contents of which are hereby incorporated by reference.

What is claimed is:

1. An image processing device for converting multi-level-image data into binary-image data by using one of a least average error method and an error diffusion method, comprising:

an image-data-correction unit which corrects multi-level-image data of a current pixel by adding thereto an error diffused from surrounding binarized pixels so as to output corrected-image data;

a binarizing unit which binarizes the corrected-image data by comparing the corrected-image data with a predetermined threshold;

an error-calculation unit which calculates an error of the current pixel based on the corrected image data and a result of the binarization; and an error-correction unit which corrects errors of surrounding pixels when the result of the binarization of the current pixel represents a predetermined one of a black dot and a white hole, and refrains from correcting the errors of the surrounding pixels when the result of the binarization of the current pixel represents another one of the black dot and the white hole.

2. The image processing device as claimed in claim 1, wherein said error-correction unit corrects the errors of surrounding pixels when the result of the binarization of the current pixel represents a black dot.

3. An image processing device for converting multi-level-image data into binary-image data by using one of a least average error method and an error diffusion method, comprising:

an image-data-correction unit which corrects multi-level-image data of a current pixel by adding thereto an error diffused from surrounding binarized pixels so as to output corrected-image data;

a binarizing unit which binarizes the corrected-image data by comparing the corrected-image data with a predetermined threshold;

an error-calculation unit which calculates an error of the current pixel based on the corrected image data and a result of the binarization; and an error-correction unit which corrects errors of surrounding pixels when the result of the binarization of the current pixel represents a predetermined one of either a black dot or a white hole, wherein said error-correction unit corrects the errors of surrounding pixels when the result of the binarization of the current pixel represents a black dot, and wherein said error-correction unit corrects the errors of surrounding pixels to an extent that varies depending on the multi-level-image data of the current pixel.

4. The image processing device as claimed in claim 3, wherein said error-correction unit corrects the errors of surrounding pixels by subtracting a value from the errors, the value varying depending on how large the multi-level-image data of the current pixel is.

5. The image processing device as claimed in claim 4, wherein said value is larger as the multi-level-image data of the current pixel decreases.

6. The image processing device for converting multi-level-image data into binary-image data by using one of a least average error method and an error diffusion method, comprising:

an image-data-correction unit which corrects multi-level-image data of a current pixel by adding thereto an error diffused from surrounding binarized pixels so as to output corrected-image data;

a binarizing unit which binarizes the corrected-image data by comparing the corrected-image data with a predetermined threshold;

an error-calculation unit which calculates an error of the current pixel based on the corrected image data and a result of the binarization; and an error-correction unit which corrects errors of surrounding pixels when the result of the binarization of the current pixel represents a predetermined one of either a black dot or a white hole, wherein said error-correction unit corrects the errors of surrounding pixels when the result of the binarization of the current pixel represents a black dot, and wherein said error-correction unit corrects the errors of surrounding pixels, a number of the surrounding pixels varying depending on the multilevel-image data of the current pixel.

7. The image processing device as claimed in claim 6, wherein said number of the surrounding pixels is larger as the multi-level-image data of the current pixel decreases.

8. The image processing device as claimed in claim 6, wherein said error-correction unit corrects the errors of surrounding pixels by subtracting a value from the errors, the value varying depending on how large the multi-level-image data of the current pixel is.

9. The image processing device as claimed in claim 8, wherein said value is larger as the multi-level-image data of the current pixel decreases.

10. A method of converting multi-level-image data into binary-image data by using one of a least average error method and an error diffusion method, comprising the steps of:

correcting multi-level-image data of a current pixel by adding thereto an error diffused from surrounding binarized pixels so as to output corrected-image data;

binarizing the corrected-image data by comparing the corrected-image data with a predetermined threshold;

calculating an error of the current pixel based on the corrected-image data and a result of the binarization; and correcting errors of surrounding pixels when the result of the binarization of the current pixel represents a predetermined one of a black dot and a white hole, and refraining from correcting the errors of the surrounding pixels when the result of the binarization of the current pixel represents another one of the black dot and the white hole.

11. The method as claimed in claim 10, wherein said step of correcting errors corrects the errors of surrounding pixels when the result of the binarization of the current pixel represents a black dot.

12. The method of converting multi-level-image data into binary-image data by using one of a least average error method and an error diffusion method, comprising the steps of:

correcting multi-level-image data of a current pixel by adding thereto an error diffused from surrounding binarized pixels so as to output corrected-image data;

binarizing the corrected-image data by comparing the corrected-image data with a predetermined threshold;

calculating an error of the current pixel based on the corrected-image data and a result of the binarization; and correcting errors of surrounding pixels when the result of the binarization of the current pixel represents a predetermined one of either a black dot or a white hole, wherein said step of correcting errors corrects the errors of surrounding pixels when the result of the binarization of the current pixel represents a black dot, and wherein said step of correcting errors corrects the errors of surrounding pixels to an extent that varies depending on the multi-level-image data of the current pixel.

13. The method as claimed in claim 12, wherein said step of correcting errors corrects the errors of surrounding pixels by subtracting a value from the errors, the value varying depending on how large the multi-level-image data of the current pixel is.

14. The method as claimed in claim 13, wherein said value is larger as the multi-level-image data of the current pixel decreases.

15. The method of converting multi-level-image data into binary-image data by using one of a least average error method and an error diffusion method, comprising the steps of:
   correcting multi-level-image data of a current pixel by adding thereto an error diffused from surrounding binarized pixels so as to output corrected-image data;
   binarizing the corrected-image data by comparing the corrected-image data with a predetermined threshold;
   calculating an error of the current pixel based on the corrected-image data and a result of the binarization; and
   correcting errors of surrounding pixels when the result of the binarization of the current pixel represents a predetermined one of either a black dot or a white hole,
   wherein said step of correcting errors corrects the errors of surrounding pixels when the result of the binarization of the current pixel represents a black dot, and
   wherein said step of correcting errors corrects the errors of surrounding pixels, a number of the surrounding pixels varying depending on the multilevel-image data of the current pixel.

16. The method as claimed in claim 15, wherein said number of the surrounding pixels is larger as the multi-level-image data of the current pixel decreases.

17. The method as claimed in claim 15, wherein said step of correcting errors corrects the errors of surrounding pixels by subtracting a value from the errors, the value varying depending on how large the multi-level-image data of the current pixel is.

18. The method as claimed in claim 17, wherein said value is larger as the multi-level-image data of the current pixel decreases.

19. A memory medium having a program embodied therein for causing a computer to convert multi-level-image data into binary-image data by using one of a least average error method and an error diffusion method, said program comprising:
   an image-data-correction unit configured to correct multi-level-image data of a current pixel by adding thereto an error diffused from surrounding binarized pixels so as to output corrected-image data;
   a binarizing unit configured to binarize the corrected-image data by comparing the corrected-image data with a predetermined threshold;
   an error-calculation unit configured to calculate an error of the current pixel based on the corrected-image data and a result of the binarization; and
   an error-correction unit configured to correct errors of surrounding pixels when the result of the binarization of the current pixel represents a predetermined one of a black dot and a white hole, and configured to refrain from correcting the errors of the surrounding pixels when the result of the binarization of the current pixel represents another one of the black dot and the white hole.

20. The memory medium as claimed in claim 19, wherein said error-correction unit corrects the errors of surrounding pixels when the result of the binarization of the current pixel represents a black dot.

21. The memory medium having a program embodied therein for causing a computer to convert multi-level-image data into binary-image data by using one of a least average error method and an error diffusion method, said program comprising:
   an image-data-correction unit configured to correct multi-level-image data of a current pixel by adding thereto an error diffused from surrounding binarized pixels so as to output corrected-image data;
   a binarizing unit configured to binarize the corrected-image data by comparing the corrected-image data with a predetermined threshold;
   an error-calculation unit configured to calculate an error of the current pixel based on the corrected-image data and a result of the binarization; and
   an error-correction unit configured to correct errors of surrounding pixels when the result of the binarization of the current pixel represents a predetermined one of either a black dot or a white hole,
   wherein said error-correction unit corrects the errors of surrounding pixels when the result of the binarization of the current pixel represents a black dot, and
   wherein said error-correction unit corrects the errors of surrounding pixels to an extent that varies depending on the multi-level-image data of the current pixel.

22. The memory medium as claimed in claim 21, wherein said error-correction unit corrects the errors of surrounding pixels by subtracting a value from the errors, the value varying depending on how large the multi-level-image data of the current pixel is.

23. The memory medium as claimed in claim 22, wherein said value Is larger as the multi-level-image data of the current pixel decreases.

24. The memory medium having a program embodied therein for causing a computer to convert multi-level-image data into binary-image data by using one of a least average error method and an error diffusion method, said program comprising:
   an image-data-correction unit configured to correct multi-level-image data of a current pixel by adding thereto an error diffused from surrounding binarized pixels so as to output corrected-image data;
   a binarizing unit configured to binarize the corrected-image data by comparing the corrected-image data with a predetermined threshold;
   an error-calculation unit configured to calculate an error of the current pixel based on the corrected-image data and a result of the binarization; and
   an error-correction unit configured to correct errors of surrounding pixels when the result of the binarization of the current pixel represents a predetermined one of either a black dot or a white hole,
   wherein said error-correction unit corrects the errors of surrounding pixels when the result of the binarization of the current pixel represents a black dot, and
   wherein said error-correction unit corrects the errors of surrounding pixels, a number of the surrounding pixels varying depending on the multilevel-image data of the current pixel.

25. The memory medium as claimed in claim 24, wherein said number of the surrounding pixels is larger as the multi-level-image data of the current pixel decreases.

26. The memory medium as claimed in claim 24, wherein said error-correction unit corrects the errors of surrounding pixels by subtracting a value from the errors, the value varying depending on how large the multi-level-image data of the current pixel is.

27. The memory medium as claimed in claim 26, wherein said value is larger as the multi-level-image data of the current pixel decreases.

* * * * *